US010117280B2

(12) United States Patent
Liu et al.

(10) Patent No.: US 10,117,280 B2
(45) Date of Patent: Oct. 30, 2018

(54) TECHNIQUES FOR RECEIVING PACKETS OVER AGGREGATED CONNECTIONS IN WIRELESS COMMUNICATIONS

(71) Applicant: QUALCOMM Incorporated, San Diego, CA (US)

(72) Inventors: Feilu Liu, San Diego, CA (US); Srinivasan Balasubramanian, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 15/265,132

(22) Filed: Sep. 14, 2016

(65) Prior Publication Data
US 2017/0118793 A1 Apr. 27, 2017

Related U.S. Application Data

(60) Provisional application No. 62/245,844, filed on Oct. 23, 2015.

(51) Int. Cl.
*H04W 72/04* (2009.01)
*H04W 76/28* (2018.01)
(Continued)

(52) U.S. Cl.
CPC ..... *H04W 76/048* (2013.01); *H04W 52/0216* (2013.01); *H04W 72/0446* (2013.01);
(Continued)

(58) Field of Classification Search
CPC . H04W 52/02; H04W 52/0216; H04W 72/04; H04W 72/0446; H04W 76/02;
(Continued)

(56) References Cited

U.S. PATENT DOCUMENTS 6,654,360 B1 * 11/2003 Abrol .................... H04L 29/06
370/329
2012/0140743 A1 * 6/2012 Pelletier ............ H04W 72/0453
370/335
(Continued)

FOREIGN PATENT DOCUMENTS

WO WO-2012/038117 A1 3/2012
WO WO-2013/067677 A1 5/2013
(Continued)

OTHER PUBLICATIONS

International Search Report and Written Opinion issued in International Patent Application No. PCT/US2016/051915 dated Dec. 2, 2016.

*Primary Examiner* — Tri H Phan
(74) *Attorney, Agent, or Firm* — Dalei Dong; Arent Fox

(57) ABSTRACT

A user equipment (UE) can establish a first connection using a first radio access technology (RAT), wherein the UE operates in a communication mode having one or more dormant periods with respect to the first connection. The UE can receive a data packet over a second connection using a second RAT, wherein the data packet is from a data flow which is allowed or configured to be delivered via the first connection and the second connection. It can be determined that the data packet is received over the second connection when the UE is operating in a dormant period of the one or more dormant periods with respect to the first connection. A termination of the dormant period over the first connection can be requested based at least in part on determining that the data packet is received when the UE is operating in the dormant period.

26 Claims, 10 Drawing Sheets

(51) Int. Cl.
*H04W 76/04* (2009.01)
*H04W 52/02* (2009.01)
*H04W 84/12* (2009.01)
*H04W 88/06* (2009.01)
*H04L 1/18* (2006.01)
*H04W 76/15* (2018.01)

(52) U.S. Cl.
CPC ........... *H04W 76/28* (2018.02); *H04L 1/1841* (2013.01); *H04W 76/15* (2018.02); *H04W 84/12* (2013.01); *H04W 88/06* (2013.01); *Y02D 70/00* (2018.01); *Y02D 70/1242* (2018.01); *Y02D 70/1262* (2018.01); *Y02D 70/142* (2018.01); *Y02D 70/146* (2018.01); *Y02D 70/24* (2018.01); *Y02D 70/26* (2018.01)

(58) Field of Classification Search
CPC ... H04W 76/04; H04W 76/048; H04W 76/15; H04W 76/28; H04W 84/12; H04W 88/06; H04W 76/00; H04L 1/18; H04L 1/1841; Y02D 70/00; Y02D 70/24; Y02D 70/26; Y02D 70/142; Y02D 70/146; Y02D 70/1242; Y02D 70/1262
See application file for complete search history.

(56) References Cited

U.S. PATENT DOCUMENTS

| | | | |
|---|---|---|---|
| 2013/0201892 A1* | 8/2013 | Holma | H04W 76/048 370/311 |
| 2015/0117357 A1* | 4/2015 | Ozturk | H04W 28/0205 370/329 |
| 2015/0289171 A1 | 10/2015 | Jung et al. | |
| 2016/0192433 A1* | 6/2016 | Deenoo | H04W 72/046 370/329 |
| 2016/0277957 A1* | 9/2016 | Patel | H04W 28/0221 |
| 2017/0134123 A1* | 5/2017 | Ozturk | H04L 1/1628 |
| 2017/0339611 A1* | 11/2017 | Landais | H04W 52/0216 |

FOREIGN PATENT DOCUMENTS

| | | |
|---|---|---|
| WO | WO-2014/172306 A2 | 10/2014 |
| WO | WO-2016/149143 A1 | 9/2016 |

* cited by examiner

TECHNIQUES FOR RECEIVING PACKETS OVER AGGREGATED CONNECTIONS IN WIRELESS COMMUNICATIONS

CLAIM OF PRIORITY UNDER 35 U.S.C. § 119

The present Application for Patent claims priority to Provisional Application No. 62/245,844 entitled "TECHNIQUES FOR RECEIVING PACKETS OVER AGGREGATED CONNECTIONS IN WIRELESS COMMUNICATIONS" filed Oct. 23, 2015, which is assigned to the assignee hereof and hereby expressly incorporated by reference herein for all purposes.

BACKGROUND

Described herein are aspects generally related to communication systems, and more particularly, to receiving packets over aggregated connections in a wireless communication system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In LTE, a user equipment (UE) can communicate with multiple access points over multiple connections where the connections are aggregated to improve efficiency of communication. For example, each of the connections can be of different radio access technologies (e.g., LTE, Institute of Electrical and Electronics Engineers (IEEE) 802.11 WiFi, etc.) and may be aggregated at a packet data convergence protocol (PDCP) layer such that the UE may receive different ordered packets over each connection for reordering, combining, and providing to an upper communication layer.

In addition, various technologies are supported in LTE where the UE can configure one or more dormant periods of time during which the UE does not communicate, such as an off cycle of a connected mode discontinuous reception (C-DRX) configuration during which the UE can sleep or power down communication resources, a period of time between semi-persistent scheduling (SPS) resources configured for the UE by the LTE access point, etc. It is possible that one or more of the dormant periods of time occur before a next packet in a sequence is received from the LTE access point. In this example, one or more additional aggregated connections may continue to transmit packets to the UE, but the UE must buffer these packets in a reorder buffer until the next packet in the sequence is received from the LTE access point (e.g., once the dormant period ends, such as after the C-DRX off duration or based on the next configured SPS resources) before providing the packets to an upper layer for processing. This can cause significant buffer memory constraints, negatively impact throughput, etc. at the UE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for communicating using traffic aggregation is provided. The method includes establishing, by a user equipment (UE), a first connection using a first radio access technology (RAT), where the UE operates in a communication mode having one or more dormant periods with respect to the first connection. The method also includes receiving, by the UE, a data packet over a second connection using a second RAT, where the data packet is from a data flow which is allowed or configured to be delivered via the first connection and the second connection. The method further includes determining that the data packet is received over the second connection when the UE is operating in a dormant period of the one or more dormant periods with respect to the first connection, and requesting a termination of the dormant period over the first connection based at least in part on determining that the data packet is received over the second connection when the UE is operating in the dormant period with respect to the first connection.

In addition, the method may include where determining that the data packet is received when the UE is operating in the dormant period comprises determining that the data packet is received when the UE is operating in an off duration of a discontinuous reception (DRX) cycle, and where requesting the termination of the dormant period is based at least in part on determining that the data packet is received when the UE is operating in the off duration of the DRX cycle. The method may also include where determining that the data packet is received when the UE is operating in the dormant period comprises determining that the data packet is received during a period where the UE is not scheduled resources in semi-persistent scheduling (SPS), and where requesting the termination of the dormant period is based at least in part on determining that the data packet is received when the UE is not scheduled resources in SPS.

Also, the method may include storing the data packet in a reorder buffer for reordering data packets in the data flow, wherein requesting termination of the dormant period is further based at least in part on storing the data packet in the reorder buffer. The method may also include detecting that a size of the reorder buffer achieves a threshold, wherein requesting the termination of the dormant period is further based at least in part on detecting the size of the reorder buffer achieving the threshold. Moreover, the method may include where requesting termination of the dormant period comprises transmitting a request to a first access node over the first connection to terminate the dormant period. The method may additionally include where the request comprises a scheduling request transmitted to the first access node to request resources for receiving additional data packets from the first access node. Also, the method may include terminating a DRX cycle based at least in part on requesting termination of the dormant period. The method may also include where terminating the DRX cycle comprises entering an on duration for a configured number of DRX cycles. Further, the method may include where the first RAT is third generation partnership (3GPP) long term evolution (LTE), and the second RAT is Institute of Electrical and Electronics Engineers (IEEE) 802.11 WiFi.

In other aspects, an apparatus for communicating using traffic aggregation is provided. The apparatus includes a transceiver, at least one processor communicatively coupled with the transceiver via a bus for communicating signals in a wireless network, and a memory communicatively coupled with the at least one processor and/or the transceiver via the bus. The at least one processor is configured to establish, via the transceiver, a first connection using a first RAT, where the apparatus operates in a communication mode having one or more dormant periods with respect to the first connection. The at least one processor is further configured to receive, via the transceiver, a data packet over a second connection using a second RAT, where the data packet is from a data flow which is allowed or configured to be delivered via the first connection and the second connection. The at least one processor is also configured to determine that the data packet is received over the second connection when the apparatus is operating in a dormant period of the one or more dormant periods with respect to the first connection, and request a termination of the dormant period over the first connection based at least in part on determining that the data packet is received over the second connection when the apparatus is operating in the dormant period with respect to the first connection.

The apparatus may also include where the at least one processor is configured to determine that the data packet is received when the apparatus is operating in the dormant period at least in part by determining that the data packet is received when the apparatus is operating in an off duration of a DRX cycle, and where the at least one processor is configured to request the termination of the dormant period based at least in part on determining that the data packet is received when the apparatus is operating in the off duration of the DRX cycle. The apparatus may also include where the at least one processor is configured to determine that the data packet is received when the apparatus is operating in the dormant period at least in part by determining that the data packet is received during a period where the apparatus is not scheduled resources in SPS, and where the at least one processor is configured to request the termination of the dormant period based at least in part on determining that the data packet is received when the apparatus is not scheduled resources in SPS.

The apparatus may also include where the at least one processor is further configured to store the data packet in a reorder buffer for reordering data packets in the data flow, wherein the at least one processor is configured to request termination of the dormant period further based at least in part on storing the data packet in the reorder buffer. Further, the apparatus may include where the at least one processor is further configured to detect that a size of the reorder buffer achieves a threshold, where the at least one processor is configured to request the termination of the dormant period further based at least in part on detecting the size of the reorder buffer achieving the threshold. Also, the apparatus may include where the at least one processor is configured to request termination of the dormant period at least in part by transmitting a request to a first access node over the first connection to terminate the dormant period. Additionally, the apparatus may include where the request comprises a scheduling request transmitted to the first access node to request resources for receiving additional data packets from the first access node.

The apparatus may also include where the at least one processor is further configured to terminate a DRX cycle based at least in part on requesting termination of the dormant period. In addition, the apparatus may include where the at least one processor is configured to terminate the DRX cycle at least in part by entering an on duration for a configured number of DRX cycles. The apparatus may also include where the first RAT is 3GPP LTE, and the second RAT is IEEE 802.11 WiFi.

In another example, an apparatus for communicating using traffic aggregation is provided. The apparatus includes means for establishing a first connection using a first RAT, where the apparatus operates in a communication mode having one or more dormant periods with respect to the first connection. The apparatus also includes means for receiving a data packet over a second connection using a second RAT, where the data packet is from a data flow which is allowed or configured to be delivered via the first connection and the second connection. Additionally, the apparatus includes means for determining that the data packet is received over the second connection when the apparatus is operating in a dormant period of the one or more dormant periods with respect to the first connection, and means for requesting a termination of the dormant period over the first connection based at least in part on the means for determining determining that the data packet is received over the second connection when the apparatus is operating in the dormant period with respect to the first connection.

The apparatus may also include where the means for determining determines that the data packet is received when the apparatus is operating in the dormant period at least in part by determining that the data packet is received when the apparatus is operating in an off duration of a DRX cycle, and where the means for requesting requests the termination of the dormant period based at least in part on determining that the data packet is received when the apparatus is operating in the off duration of the DRX cycle. Additionally, the apparatus may include where the means for determining determines that the data packet is received when the apparatus is operating in the dormant period at least in part by determining that the data packet is received during a period where the apparatus is not scheduled resources in SPS, and where the means for requesting requests the termination of the dormant period based at least in part on determining that the data packet is received when the apparatus is not scheduled resources in SPS.

The apparatus may also include means for storing the data packet in a reorder buffer for reordering data packets in the data flow, wherein the means for requesting requests termination of the dormant period further based at least in part on storing the data packet in the reorder buffer. Further, the apparatus may include where the means for requesting requests termination of the dormant period at least in part by transmitting a request to a first access node over the first connection to terminate the dormant period.

In other aspects, a computer-readable storage medium including computer-executable code for communicating using traffic aggregation is provided. The code includes code for establishing, by a UE a first connection using a first RAT, where the UE operates in a communication mode having one or more dormant periods with respect to the first connection. The code also includes code for receiving, by the UE, a data packet over a second connection using a second RAT, where the data packet is from a data flow which is allowed or configured to be delivered via the first connection and the second connection. Moreover, the code includes code for determining that the data packet is received over the second connection when the UE is operating in a dormant period of the one or more dormant periods with respect to the first connection, and code for requesting a termination of the dormant period over the first connection based at least in part on the code for determining determining that the data packet is received over the second connection when the UE is operating in the dormant period with respect to the first connection.

The computer-readable storage medium may also include where the code for determining determines that the data packet is received when the UE is operating in the dormant period at least in part by determining that the data packet is received when the UE is operating in an off duration of a DRX cycle, and where the code for requesting requests the termination of the dormant period based at least in part on determining that the data packet is received when the UE is operating in the off duration of the DRX cycle. The computer-readable storage medium may also include where the code for determining determines that the data packet is received when the UE is operating in the dormant period at least in part by determining that the data packet is received during a period where the UE is not scheduled resources in SPS, and where the code for requesting requests the termination of the dormant period based at least in part on determining that the data packet is received when the UE is not scheduled resources in SPS.

Also, the computer-readable storage medium may include code for storing the data packet in a reorder buffer for reordering data packets in the data flow, wherein the code for requesting requests termination of the dormant period further based at least in part on storing the data packet in the reorder buffer. Further, the computer-readable storage medium may include where the code for requesting requests termination of the dormant period at least in part by transmitting a request to a first access node over the first connection to terminate the dormant period.

According to another example, a method for communicating using traffic aggregation is provided. The method includes communicating, by an evolved Node B (eNB), with a UE using a first RAT over a first connection, wherein the eNB operates in a DRX cycle with respect to the first connection, aggregating communications with the UE via a second access node using a second RAT over a second connection, receiving a request from the UE to terminate the DRX cycle over the first connection, and terminating the DRX cycle for the UE over the first connection based on receiving the request.

In other aspects, an eNB for communicating using traffic aggregation is provided. The eNB includes a transceiver, at least one processor communicatively coupled with the transceiver via a bus for communicating signals in a wireless network, and a memory communicatively coupled with the at least one processor and/or the transceiver via the bus. The at least one processor and the memory are operable to communicate with a UE using a first RAT over a first connection, wherein the eNB operates in a DRX cycle with respect to the first connection, aggregate communications with the UE via a second access node using a second RAT over a second connection, receive a request from the UE to terminate the DRX cycle over the first connection, and terminate the DRX cycle for the UE over the first connection based on receiving the request.

In another example, an eNB for communicating using traffic aggregation is provided. The eNB includes means for communicating with a UE using a first RAT over a first connection, wherein the eNB operates in a DRX cycle with respect to the first connection, means for aggregating communications with the UE via a second access node using a second RAT over a second connection, means for receiving a request from the UE to terminate the DRX cycle over the first connection, and means for terminating the DRX cycle for the UE over the first connection based on receiving the request.

In other aspects, a computer-readable storage medium comprising computer-executable code for communicating using traffic aggregation is provided. The code includes code for communicating, by an eNB, with a UE using a first RAT over a first connection, wherein the eNB operates in a DRX cycle with respect to the first connection, code for aggregating communications with the UE via a second access node using a second RAT over a second connection, code for receiving a request from the UE to terminate the DRX cycle over the first connection, and code for terminating the DRX cycle for the UE over the first connection based on receiving the request.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
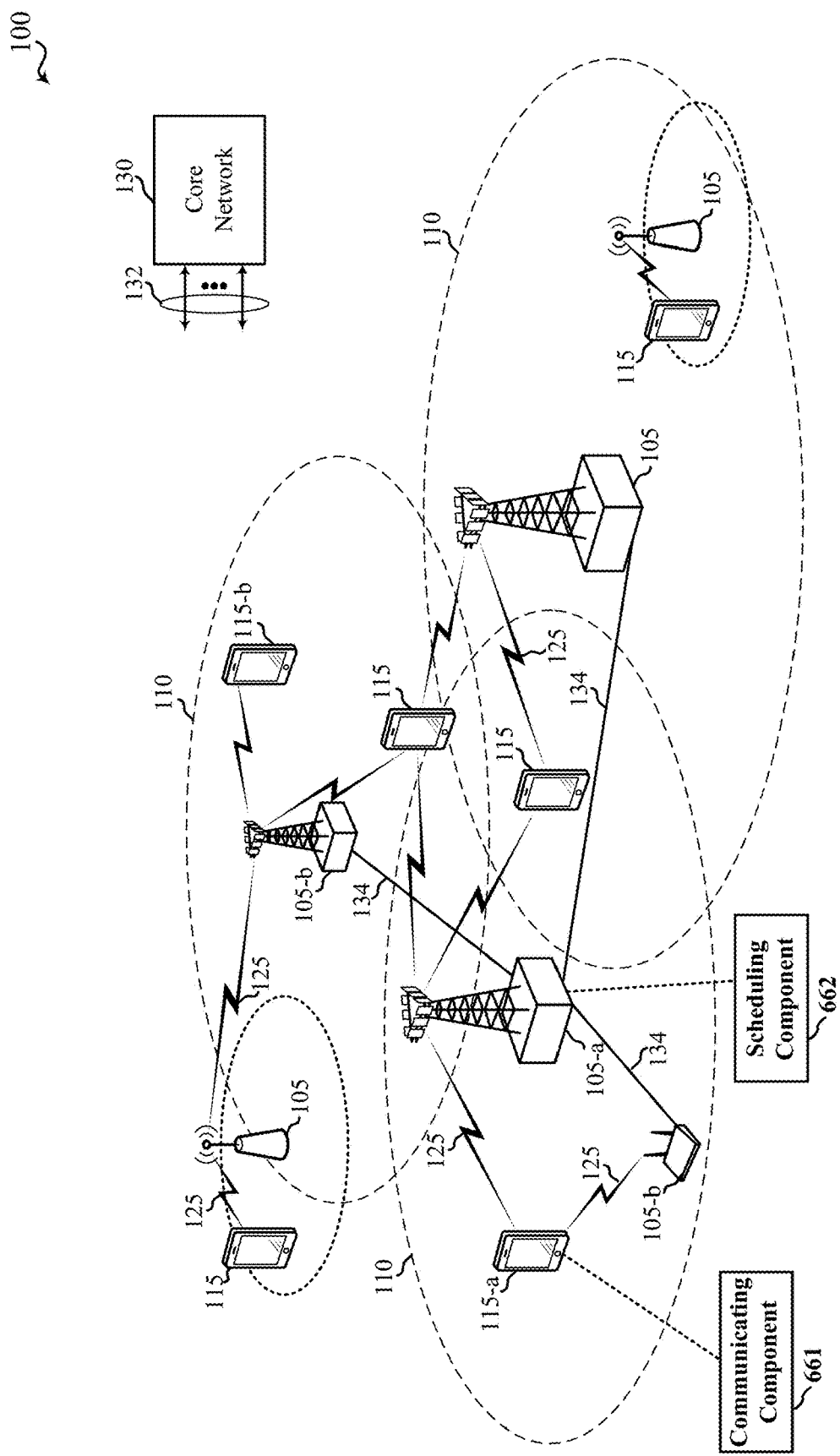
FIG. 1 shows a diagram illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to receiving packets over aggregated wireless connections where communication resources can be managed to allow receipt of one or more packets over one of the aggregated connections. For example, a UE may communicate with one or more access points using the aggregated connections, and at least one of the one or more access points may configure a communication mode having one or more dormant periods with the UE during which communications are not transmitted (e.g., and/or during which the UE may deactivate at least a portion of radio frequency (RF) resources to conserve power). For example, the access point can configure a DRX mode for the UE having a DRX cycle that can have at least one DRX on duration during which the UE can activate communication resources (e.g., a transceiver, antenna, one or more RF front end components, etc.) to receive communications from a corresponding access point, and at least one DRX off duration (e.g., a dormant period) during which the UE can sleep (e.g., terminate power to at least a portion of) the communication resources. In LTE, for example, the DRX on duration may be part of a DRX Active Time that also includes receiving control or other communications. The DRX off duration may include the period of time that the UE is not in DRX Active Time (e.g., the time during which the UE is not expected to receive control information or user data from any channel). In any case, the UE and/or a corresponding access point can configure the DRX cycle to include the DRX Active Time and the DRX off duration. In another example, the access point can configure the UE with a communication mode based on a semi-persistent scheduling (SPS) of resources that may result in one or more periods (e.g., one or more dormant periods) during which the UE does not have active communication resources. In either case, the UE can experience dormant periods of time during which the UE does not receive communications from (or transmit communications to) the access point.

Moreover, for example, a user equipment (UE) can be configured with traffic aggregation over multiple connections to one or more access points, each of which may correspond to a radio access technology (RAT). Traffic aggregation can include substantially any configuration of connections between a UE and one or more access points where a common data flow is split among multiple lower layer connections at the transmitter (e.g., as multiple connections to the one or more access points). In traffic aggregation, packets received over the multiple connections are combined and reordered at the receiver (e.g., the UE) in the common data flow for providing to a higher layer. In an example, the multiple aggregated connections can be configured to transmit different ordered packets to the UE, and the UE can reorder the packets received over the multiple aggregated connections (e.g., based on a sequence number specified in the packets). Where a first connection of the multiple connections enters a dormant period (e.g., an off duration of a DRX cycle, a period where no SPS resources are configured for the UE, etc.), packets from one or more other connections of the multiple connections that are received out-of-order (e.g., due to the dormant nature of the first connection) may be stored in a reorder buffer. For example, the access point providing the first connection may refrain from transmitting one or more packets that may be the next packet(s) in the sequence, and thus the UE can continue to buffer packets received from one or more of the other multiple connections in the reorder buffer until the next packet(s) in the sequence are received (e.g., once the first connection enters an on duration of a DRX cycle or DRX Active Time, once scheduled SPS resources can be used, etc.). This can impact throughput, and/or user experience, at the UE, require significant memory capability at the UE to buffer the out of order packets, etc.

Accordingly, the UE can request that the communication mode or associated dormant period be terminated so the UE can activate communication resources and receive packets over the first connection. For example, the UE may request that the DRX cycle (or at least the off duration of the DRX cycle) be terminated. Thus, for example, the access point may begin a next DRX cycle on duration or DRX Active Time, switch from an off duration to an on duration in the DRX cycle or DRX Active Time, schedule resources to the UE, etc., such that the UE may receive communications from the access point, which may include the next packet(s) in the sequence. For example, the UE can request the DRX cycle, be terminated by transmitting a message to begin a new DRX cycle (or a set of DRX cycles), a message to switch to an on duration in the DRX cycle, a scheduling request for resources over which to receive packets from the access point, etc. In a specific example, in LTE, the DRX cycle can correspond to a connected mode DRX (C-DRX) cycle. In yet another example, the UE may request resource scheduling (e.g., outside of the SPS resources and/or to terminate a SPS configuration) from the access point to obtain resources over which the next packet(s) can be received from the access point. In either case, requesting termination of the dormant period can allow the UE to reorder these packet(s) and other packets received and buffered from the one or more other connections.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105 (e.g., 105, 105-*a*, 105-*b*, etc.), a number of user equipment (UEs) 115, and a core network 130. Access points 105 may include a scheduling component 662 for scheduling one or more UEs 115 with resources for communicating according to a communication mode having one or more dormant periods where the one or more UEs 115 may not have scheduled resources for communicating with the access point(s) 105. Similarly, one or more of UEs 115 may include a communicating component 661 for communicating with one or more access points 105 based the resource scheduling. Moreover, for example, scheduling component 662 may provide UE 115-*a* with resources for receiving communications from the access point 105-*a* and one or more additional access points 105-*b* in traffic aggregation, and communicating component 661 can communicate with the multiple access points 105-*a*/105-*b* using traffic aggregation.

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In this regard, a UE 115 can be configured to communicate with one or more access points 105 over multiple carriers using carrier aggregation (CA) (e.g., with one access point 105) and/or multiple connectivity (e.g., with multiple access points 105). In either case, in an example, UE 115 can be configured with at least one primary cell (PCell) configured to support uplink and downlink communications between UE 115 and an access point 105. In an example, there can be a PCell for each communication link 125 between a UE 115 and a given access point 105. In addition, each of the communication links 125 can have one or more secondary cells (SCell) that can support uplink and/or downlink communications as well. In some examples, the PCell can be used to communicate at least a control channel, and the SCell can be used to communicate a data channel. In one example, the PCell and/or SCell can configure one or more enhanced component carriers (eCC) that provide lower latency communications, as described further herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNB, Home NodeB, a Home eNB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul link 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, small cell eNBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105) or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

In addition, for example, some access points 105 can support traffic aggregation such that access points using different RATs can communicate to aggregate traffic from both access points (e.g., for a given UE 115) over a common higher layer data flow. For example, UE 115-a can communicate with access point 105-a, which may be an eNB in LTE, over a first connection, and access point 105-b, which may be a WLAN access point, over a second connection. Access point 105-a can communicate with access point 105-b (e.g., over a wired or wireless backhaul link 134) to schedule traffic for UE 115-a between the access points 105-a/105-b for communicating to the UE 115-a. Thus, in one example, UE 115-a may support LTE and WiFi communications using one or more transceivers. In this regard, for example, traffic aggregation can be established for the UE 115-a such that UE 115-a receives data for a wireless network from access point 105-a and access point 105-b, which operate different RANs, using respective RATs. Access point 105-a may schedule and/or otherwise provide the data to access point 105-b for communicating in the related wireless network. This configuration allows for increased throughput or other improved connectivity properties for the UE 115-a.

Aggregating the connections in this regard may occur at a PDCP layer or other layer such that communications may be received over lower layers of the connections with the access points 105-a/105-b in no specific order, but may include a mechanism to allow ordering of the communications (e.g., a sequence number in a packet). Thus, UE 115-a can receive communications over the multiple connections from access points 105-a and 105-b, and may reorder the communications in a common higher layer (e.g., PDCP layer) data flow for providing to an upper layer (e.g., a transmission control protocol (TCP) layer) for processing.

Figure 2:
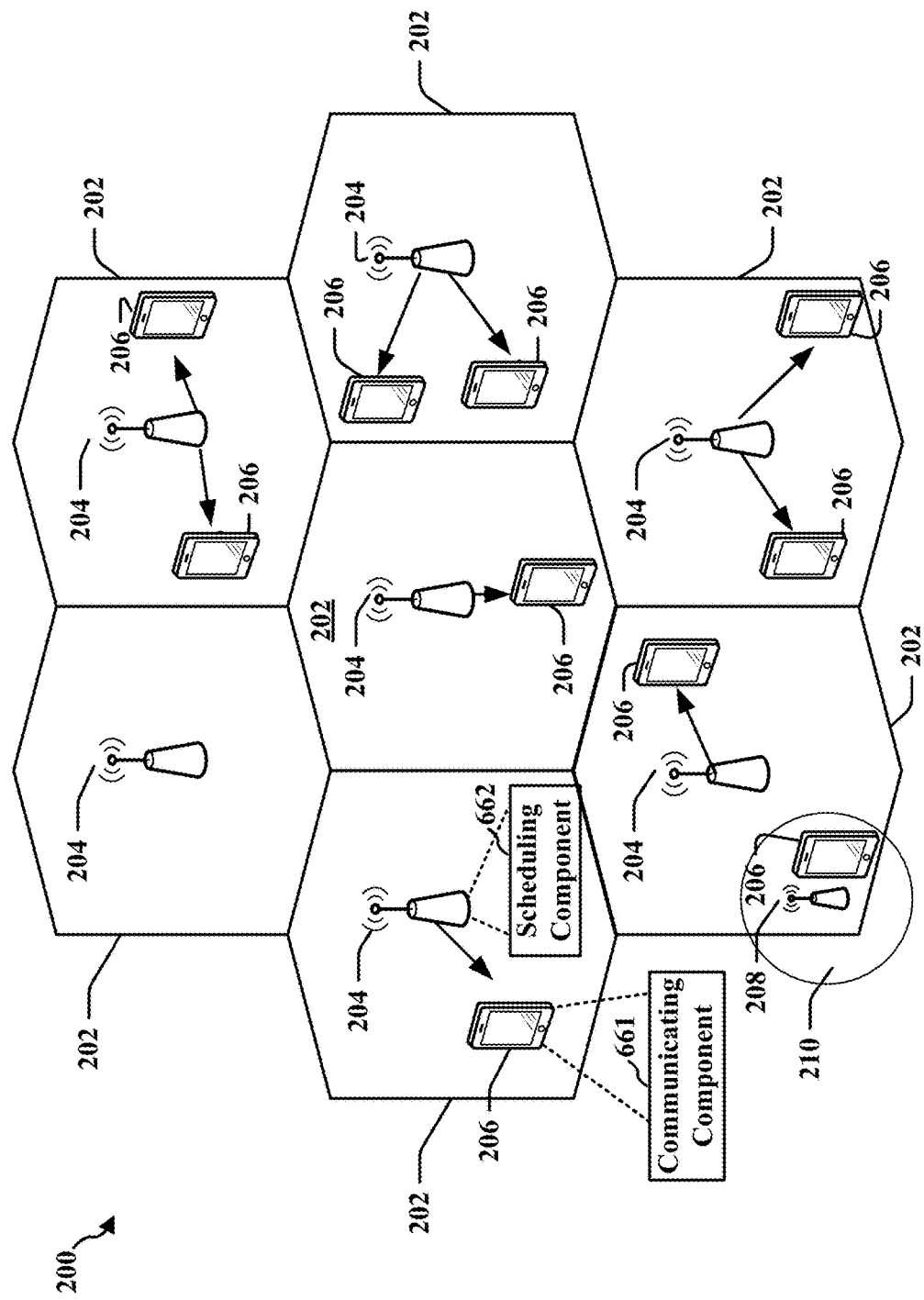
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 may include a scheduling component 662 for scheduling one or more UEs 206 with resources for communicating according to a communication mode having one or more dormant periods. Similarly, one or more of UEs 206 may include a communicating component 661 for communicating with one or more eNBs 204 based on the scheduled resources. Moreover, for example, scheduling component 662 may provide one or more UEs 206 with resources for receiving communications from the eNB 204 and one or more other access points in traffic aggregation, and communicating component 661 can communicate with the eNB 204 and/or one or more access points using traffic aggregation. There is no centralized controller shown in this example of an access network 200, but a centralized controller may be used in alternative configurations. The eNBs 204 are responsible for all radio related functions including radio bearer control, admission control, mobility control, scheduling, security, and connectivity to a serving gateway (not shown).

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (WiFi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
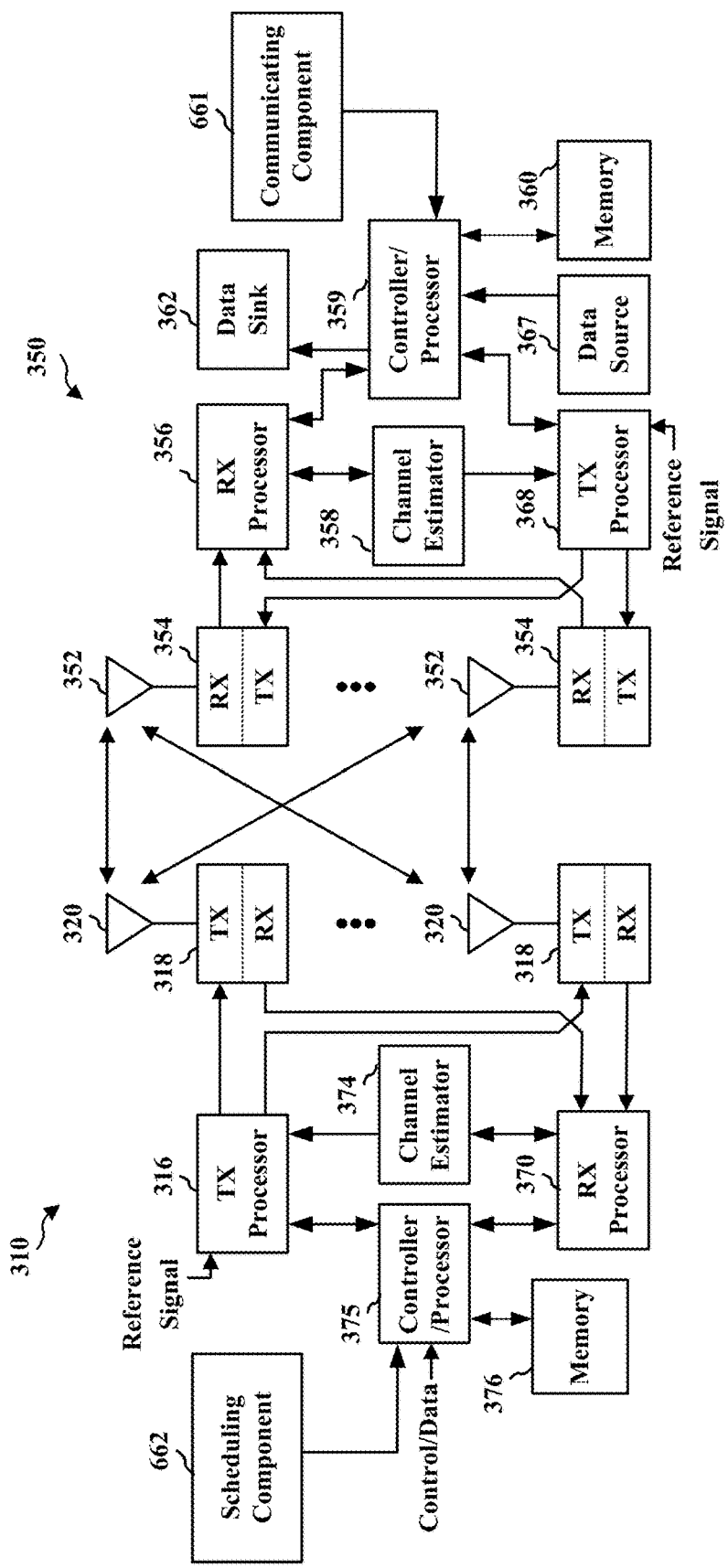
FIG. 3 is a diagram illustrating an example of an evolved Node B and user equipment (UE) in an access network.

FIG. 3 is a block diagram of an eNB 310 (e.g., access point 105, eNB 204, 208, 405, 505, 604, etc.) in communication with a UE 350 (e.g., UE 115, 206, 415, 515, 602, etc.) in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

In addition, eNB 310 may include a scheduling component 662 for scheduling one or more UEs 350 with resources for communicating according to a communication mode having one or more dormant periods. Moreover, for example, scheduling component 662 may provide one or more UEs 350 with resources for receiving communications from the eNB 310 and one or more additional access points in traffic aggregation. Though shown as coupled to or otherwise implemented by controller/processor 375, scheduling component 662 (and/or one or more components thereof) can be coupled to or implemented by substantially any processor(s) of eNB 310, such as TX processor 316, RX processor 370, etc. to provide the functions described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359. In addition, UE 350 may include a communicating component 661 for communicating with one or more eNBs 310 based on the scheduled resources from eNB 310, and/or communicating with the eNB and/or multiple access points using traffic aggregation. Though shown as coupled to or otherwise implemented by controller/processor 359, communicating component 661 (and/or one or more components thereof) can be coupled to or implemented by substantially any processor(s) of UE 350, such as RX processor 356, TX processor 368, etc. to provide the functions described herein.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
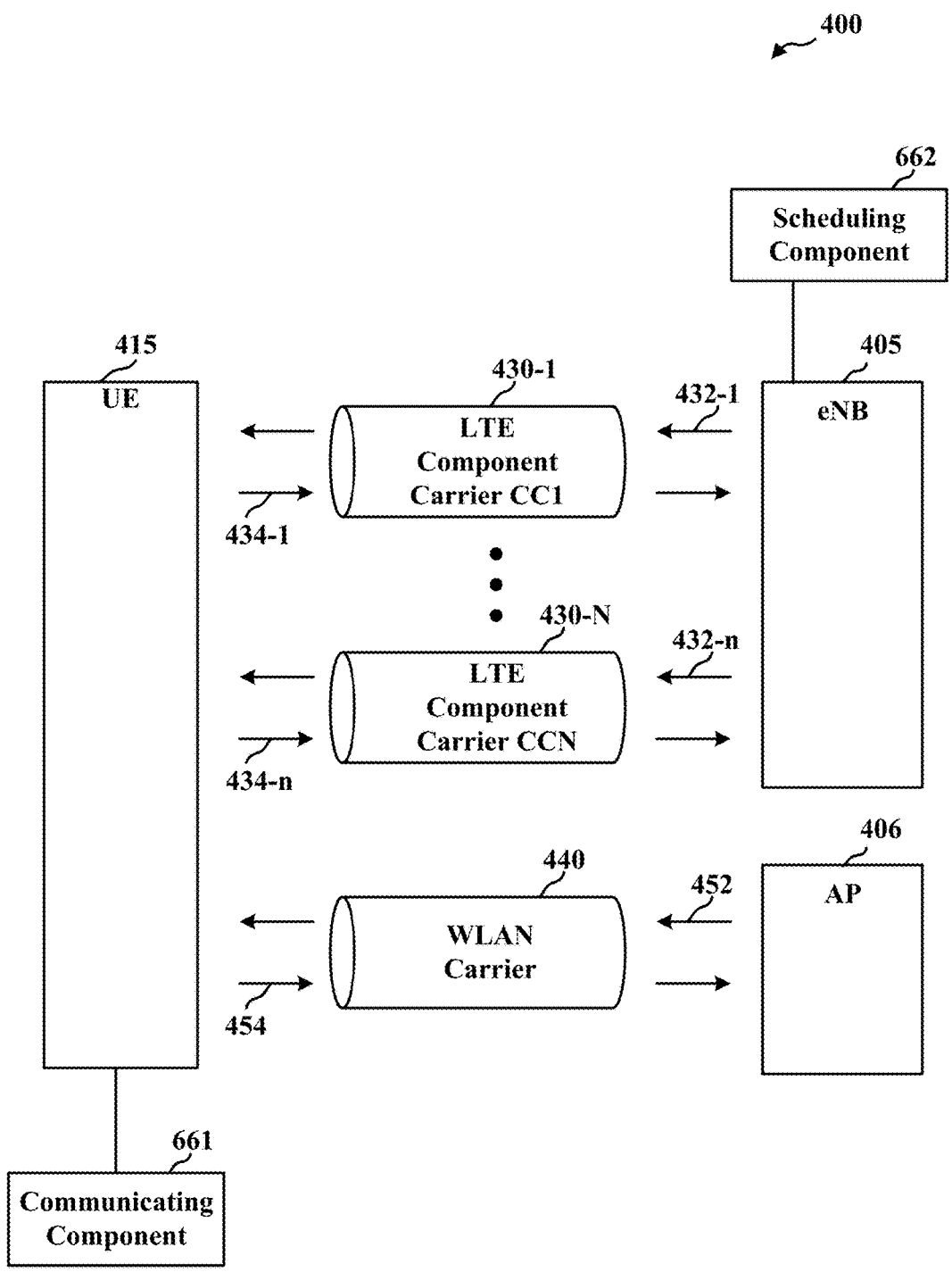
FIG. 4 is a diagram illustrating an aggregation of radio access technologies at a UE, in accordance with various aspects described herein.

FIG. 4 is a block diagram conceptually illustrating an aggregation of radio access technologies at a UE, in accordance with aspects described herein. The aggregation may occur in a system 400 including a multi-mode UE 415, which can communicate with an eNB 405 using one or more component carriers 1 through N (CC1-CCN), and/or with a WLAN access point (AP) 406 using WLAN carrier 440. A multi-mode UE in this example may refer to a UE that supports more than one RAT. eNB 405 may include a scheduling component 662, as described herein, for scheduling communications for one or more UEs 415 to communicate with eNB 405 and/or with another access point (e.g., AP 406) using traffic aggregation. UE 415 may include a communicating component 661 for receiving one or more parameters from one or more eNBs 405 to communicate with the one or more eNBs 405 and one or more other access points (e.g., AP 406) using traffic aggregation, as described further herein. For example, the UE 415 can support at least a WWAN radio access technology (e.g., LTE) and a WLAN radio access technology (e.g., WiFi). A multi-mode UE may also support carrier aggregation using one or more of the RATs. The UE 415 may be an example of one or more of the UEs 115, 206, 350, 515, 602, etc. The eNB 405 and/or AP 406 may be an example of one of the eNBs 204, 208, 310, 505, 604, etc., or access points of 105, 506, 601, etc. While only one UE 415, one eNB 405, and one AP 406 are illustrated in FIG. 4, in an example, the system 400 can include any number of UEs 415, eNBs 405, and/or APs 406. In one specific example, UE 415 can communicate with one eNB 405 over one LTE component carrier 430 while communicating with another eNB 405 over another component carrier 430.

The eNB 405 can transmit information to the UE 415 over forward (downlink) channels 432-1 through 432-N on LTE component carriers CC1 through CCN 430. In addition, the UE 415 can transmit information to the eNB 405 over reverse (uplink) channels 434-1 through 434-N on LTE component carriers CC1 through CCN. Similarly, the AP 406 may transmit information to the UE 415 over forward (downlink) channel 452 on WLAN carrier 440. In addition, the UE 415 may transmit information to the AP 406 over reverse (uplink) channel 454 of WLAN carrier 440.

In describing the various entities of FIG. 4, as well as other figures associated with some of the disclosed embodiments, for the purposes of explanation, the nomenclature associated with a 3GPP LTE or LTE-A wireless network is used. However, in an example, the system 400 can operate in other networks such as, but not limited to, an OFDMA wireless network, a CDMA network, a 3GPP2 CDMA2000 network and the like.

In multi-carrier operations, the downlink control information (DCI) messages associated with different UEs 415 can be carried on multiple component carriers. For example, the DCI on a PDCCH can be included on the same component carrier that is configured to be used by a UE 415 for physical downlink shared channel (PDSCH) transmissions (i.e., same-carrier signaling). Alternatively, or additionally, the DCI may be carried on a component carrier different from the target component carrier used for PDSCH transmissions (i.e., cross-carrier signaling). In some implementations, a carrier indicator field (CIF), which may be semi-statically enabled, may be included in some or all DCI formats to facilitate the transmission of PDCCH control signaling from a carrier other than the target carrier for PDSCH transmissions (cross-carrier signaling).

In the present example, the UE 415 may receive data from eNB 405 and AP 406 over aggregated connections or carriers. For example, eNB 405 can schedule data transmissions for the UE 415 and for the AP 406 to transmit to the UE 415, which the UE 415 can order into a common data flow at a higher layer (e.g., a PDCP layer). Where the eNB 405 configures one or more dormant periods in communication resources for the UE 415 (e.g., as an off duration of a DRX cycle, a period during which SPS resources are not scheduled, etc.) and UE 415 receives a packet from AP 406, UE 415 can request eNB 405 to terminate the one or more dormant periods (e.g., by requesting termination of the DRX cycle or at least the DRX off duration of the DRX cycle, by requesting scheduling of resources, etc.). UE 415 can request termination of the one or more dormant periods by sending a message to terminate the DRX cycle or duration to the eNB 405, sending a message to switch to an on duration of the DRX cycle to eNB 405, sending a scheduling request for resources to the eNB 405, etc.

For example, eNB 405 may configure the off duration of the DRX cycle or otherwise refrain from scheduling resources to the UE 415 for a period of time in SPS scheduling prior to sending a packet to UE 415, where the packet may be needed to provide a sequence of packets to an upper layer. In this example, AP 406 may continue to send packets to UE 415 such that the UE 415 buffers the packets until the next sequential packet is received from eNB 405. Thus, UE 415 can request the eNB 405 continue to transmit packets (e.g., by requesting termination of the DRX cycle or off duration, requesting resources in a scheduling request, etc.) based on at least one of: receiving packets from the AP 406; determining that a next sequence packet is needed based on receiving subsequent packets from the AP 406; detecting that a reorder buffer size for the packets achieves a threshold, etc. The eNB 405 can accordingly terminate the DRX cycle (or off duration), schedule resources for the UE 415, etc., and can transmit packets to the UE 415, which may include the next sequential packet for reordering a plurality of packets.

Figure 5:
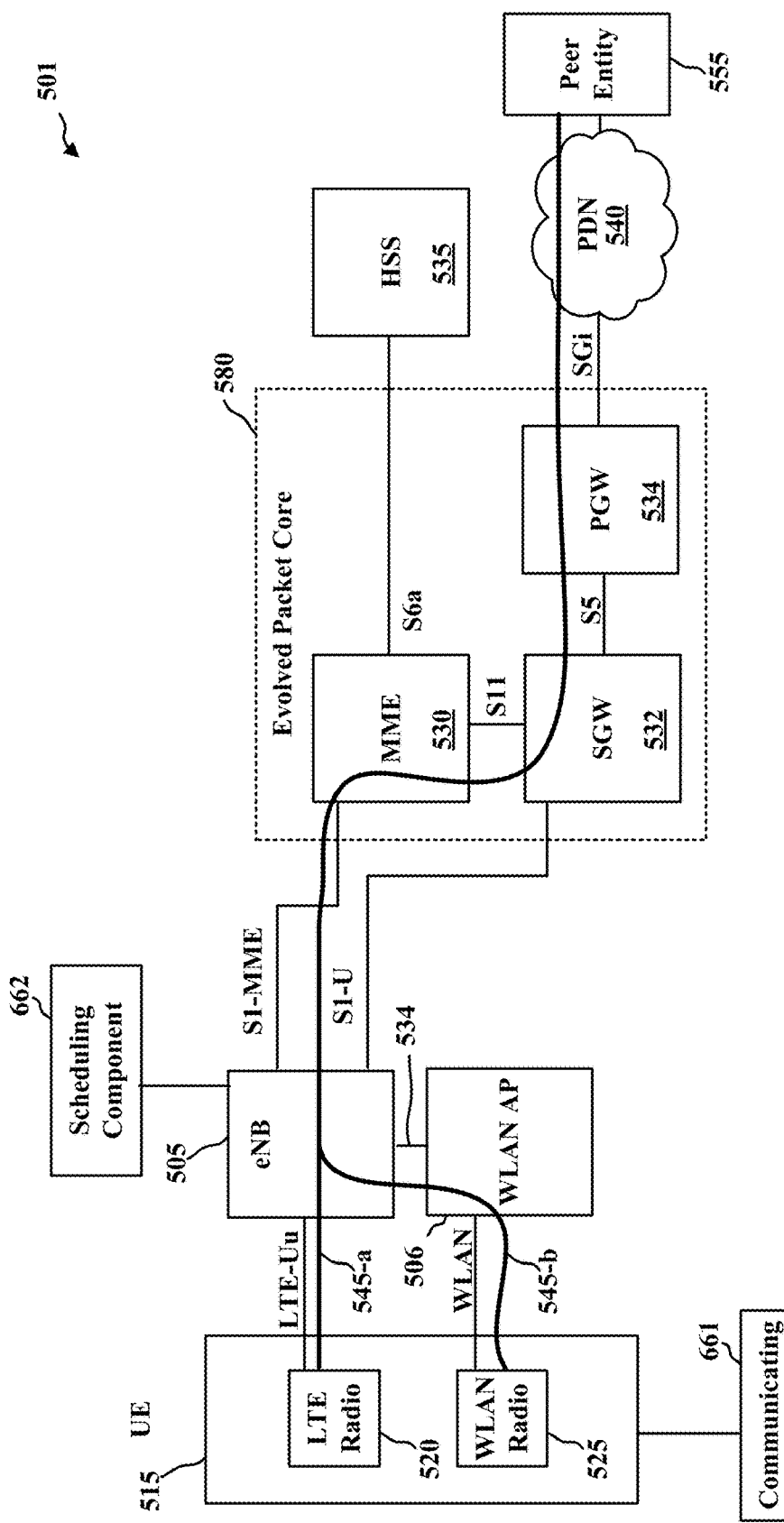
FIG. 5 is a diagram illustrating an example of data paths between a UE and a packet data network (PDN) in accordance with various aspects described herein.

FIG. 5 is a block diagram conceptually illustrating an example of data paths 545-a and 545-b between the UE 515 and the EPC 580 in accordance with an aspect of the aspects described herein. The data paths 545-a, 545-b are shown within the context of a wireless communications system 501 for aggregating traffic for transmitting using resources of eNBs 505 and WLAN AP 506. This bearer configuration includes data path 545-a that traverses eNB 505, and a data path 545-b that traverses WLAN AP 506 and eNB 505 in traffic aggregation. The wireless communications system 501 may include a UE 515, eNB 505, WLAN AP 506, an evolved packet core (EPC) 580, a PDN 540, and a peer entity 555. The UE 515 may be configured to support traffic aggregation, as described herein, though the traffic aggregation can be controlled by eNB 505 and may be agnostic to upper layers of the UE 515. eNB 505 may include a scheduling component 662, as described herein, for scheduling communications for one or more UEs 515 to communicate with eNB 505 and/or with another access point (e.g., WLAN AP 506) using traffic aggregation. One or more UEs 515 may include a communicating component 661 for receiving one or more parameters from one or more eNBs 505 to communicate with the one or more eNBs 505 and one or more other base stations (e.g., WLAN AP 506) using traffic aggregation, as described further herein.

The EPC 580 may include a mobility management entity (MME) 530, a serving gateway (SGW) 532, and a PDN gateway (PGW) 534. A home subscriber system (HSS) 535 may be communicatively coupled with the MME 530. The UE 515 may include an LTE radio 520 and a WLAN radio 525. In an example, the UE 515 can include one or more such radios and/or the radios may be integrated. Thus, in an example, LTE radio 520 can also include a WLAN radio (or can be configured to process WLAN signals) in addition to the WLAN radio 525, and in this example, UE 515 includes two WLAN interfaces—one in the LTE radio 520 and one in the WLAN radio 525. These elements may represent aspects of one or more of their counterparts described above with reference to the previous or subsequent Figures. For example, the UE 515 may be an example of one or more of UEs 115, 206, 350, 515, 602, etc., the eNB 505-a and/or WLAN AP 506 may be an example of one or more of the eNBs 204, 208, 310, 505, 604, etc., access points of 105, 506, 601, etc., and/or the EPC 580 may be an example of the core network 130 of FIG. 1.

The eNB 505-a may be capable of providing the UE 515 with access to the PDN 540, which may relate to one or more LTE component carriers, as described. WLAN AP 506 may be capable of providing the UE 515 with access to the PDN 540 by traversing the eNB 505. Thus, eNB 505 and WLAN AP 506 can communicate to aggregate traffic for UE 515. For example, a scheduler at eNB 505 can schedule data packets for transmitting to the UE 515 via eNB 505 (e.g., via data path 545-a) and via WLAN AP 506 (e.g., via data path 545-b), which may include eNB 505 transmitting data packets to WLAN AP 506 over backhaul link 534 for transmitting to UE 515. As described, the eNB 505 can transmit the data packets to the WLAN AP 506 for providing to the UE 515 over a lower network layer, such as a media access control (MAC) layer, RLC layer, etc., for aggregating into a common data flow for a higher layer, such as a RLC layer, PDCP layer, etc.

Accordingly, the UE 515 may involve traffic aggregation where one connection is to a first access point (eNB 505) and the other connection is to a second access point (WLAN AP 506), where the second access point communicates with the first access point to aggregate traffic for the UE 515. Using this configuration, bearers established for the UE 515 with EPC 580 can be with the eNB 505 and/or the WLAN AP 506. In one example, bearer selection can be configured where the UE 515 has separate bearers established between the EPC 508 and the eNB 505 and between the EPC 580 and the WLAN AP 506 (via eNB 505). In this example, data traffic (e.g., IP packets) is sent over respective bearers, which can map to carriers between the UE 515 and eNB 505/WLAN AP 506. In another example, RLC/PDCP level aggregation can be configured where the UE 515 bearers are between the eNB 505 and EPC 580 even for the WLAN AP 506 carriers. In this example, data traffic (e.g., IP packets) is aggregated at the RLC/PDCP level and communicated to UE 515 or respective carriers with the eNB 505 and WLAN AP 506. In addition, for example, eNB 505 and WLAN AP 506 may communicate over a backhaul link 534 to coordinate providing communication resources to the UE 515, receiving communications from the UE 515, etc.

While aspects of FIG. 5 have been described with respect to LTE, similar aspects regarding aggregation and/or multiple connections may also be implemented with respect to UMTS or other similar system or network wireless communications radio technologies.

Figure 6:
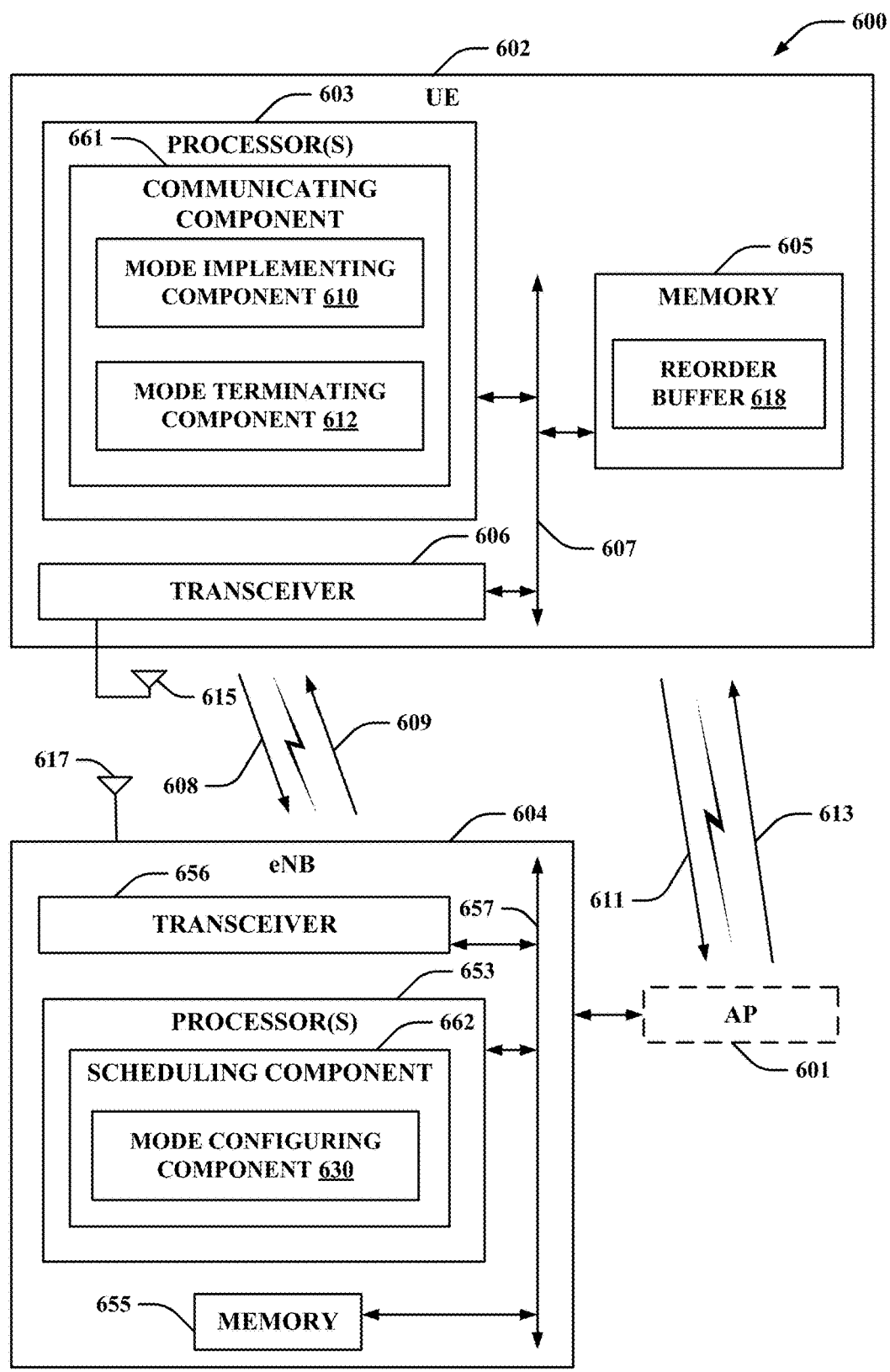
FIG. 6 is a diagram illustrating an example of a system for aggregating connections in wireless communications in accordance with aspects described herein.
Figure 7:
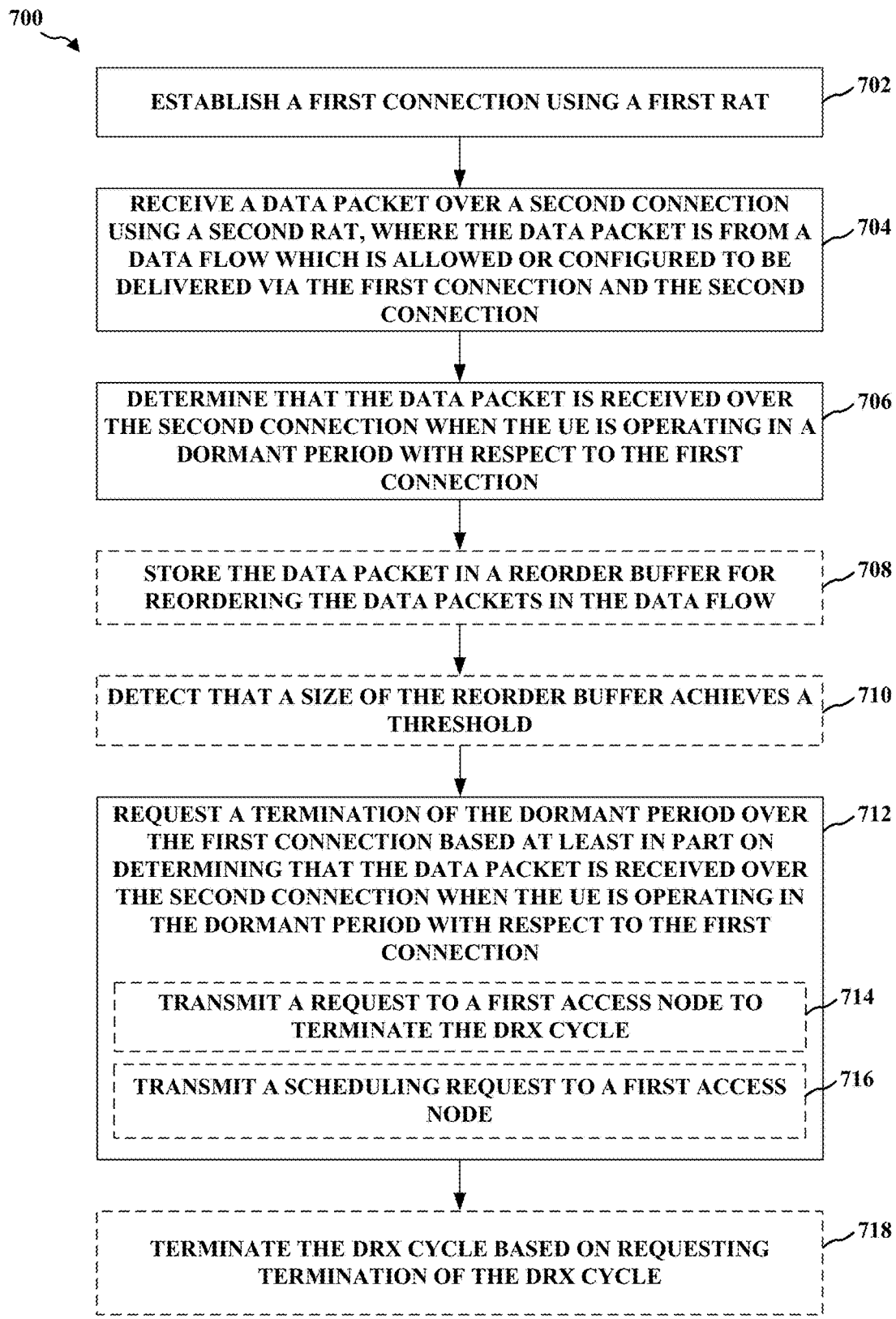
FIG. 7 is a flow chart of an example of a method of managing aggregation of traffic data in accordance with aspects described herein.
Figure 8:
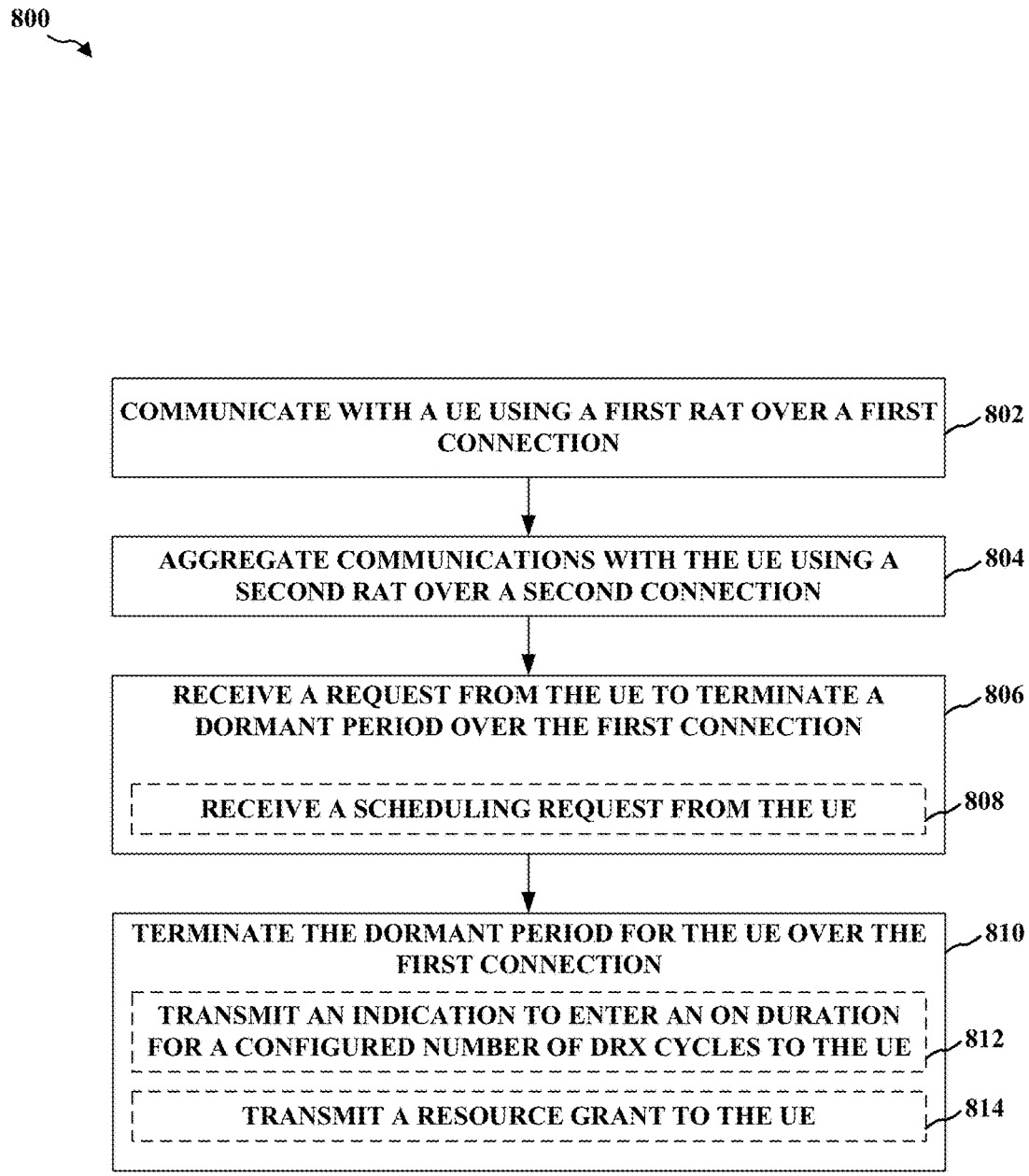
FIG. 8 is a flow chart of an example of a method of managing aggregation of traffic data in accordance with aspects described herein.

Referring to FIGS. 6-8, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 7 and 8 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 6 illustrates an example of a system 600 for aggregating traffic data for UEs over multiple connections. System 600 includes a UE 602 that communicates with an eNB 604, and/or optionally an access point 601, to access a wireless network, examples of which are described in FIGS. 1-5, above. In an aspect, eNB 604 and UE 602 may have established one or more downlink channels over which to communicate via downlink signals 609, which can be transmitted by eNB 604 (e.g., via transceiver 656) and received by UE 602 (e.g., via transceiver 606) for communicating control and/or data messages (e.g., signaling) from the eNB 604 to the UE 602 over configured communication resources. In an example, eNB 604 and UE 602 can implement traffic aggregation to facilitate communicating packet data over multiple instances of a network layer (e.g., a PDCP layer) in a common data flow, where the instances may each correspond to one or more component carriers between the eNB 604 and UE 602, one or more additional component carriers between the optional access point 601 and UE 602, etc. As shown, for example, the UE 602 can establish one or more downlink channels for communicating downlink signals 613 with AP 601 to receive aggregated traffic data. Moreover, for example, eNB 604 and UE 602 may have established one or more uplink channels over which to communicate via uplink signals 608, which can be transmitted by UE 602 (e.g., via transceiver 606) and received by eNB 604 (e.g., via transceiver 656) for communicating control and/or data messages (e.g., signaling) from the UE 602 to the eNB 604 over configured communication resources, and/or one or more similar uplink channels for communicating uplink signals 611 with AP 601.

In an aspect, UE 602 may include one or more processors 603 and/or a memory 605 that may be communicatively coupled, e.g., via one or more buses 607, and may operate in conjunction with or otherwise implement a communicating component 661 for communicating with an eNB 604 and/or access point 601 using traffic aggregation, communicating with the eNB 604 using scheduling resources, etc. For example, the various operations related to communicating component 661 may be implemented or otherwise executed by one or more processors 603 and, in an aspect, can be executed by a single processor, while in other aspects, different ones of the operations may be executed by a combination of two or more different processors. For example, in an aspect, the one or more processors 603 may include any one or any combination of a modem processor, or a baseband processor, or a digital signal processor, or an application specific integrated circuit (ASIC), or a transmit processor, receive processor, or a transceiver processor associated with transceiver 606. Further, for example, the memory 605 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 603. Moreover, memory 605 or computer-readable storage medium may be resident in the one or more processors 603, external to the one or more processors 603, distributed across multiple entities including the one or more processors 603, etc.

In particular, the one or more processors 603 and/or memory 605 may execute actions or operations defined by communicating component 661 or its subcomponents. For instance, the one or more processors 603 and/or memory 605 may execute actions or operations defined by a mode implementing component 610 for communicating with the eNB 604 according to one or more communication modes having one or more dormant periods, which may be configured by the eNB 604, such as a DRX mode according to a DRX cycle, a SPS mode based on SPS resources, etc. In an aspect, for example, mode implementing component 610 may include hardware (e.g., one or more processor modules of the one or more processors 603) and/or computer-readable code or instructions stored in memory 605 and executable by at least one of the one or more processors 603 to perform the specially configured mode implementing operations described herein.

Further, for instance, the one or more processors 603 and/or memory 605 may execute actions or operations defined by a mode terminating component 612 for requesting termination of the one or more communication modes, such as the DRX mode or cycle (or at least an off duration of the DRX cycle), the SPS mode, etc. In an aspect, for example, mode terminating component 612 may include hardware (e.g., one or more processor modules of the one or more processors 603) and/or computer-readable code or instructions stored in memory 605 and executable by at least one of the one or more processors 603 to perform the specially configured communication mode terminating operations described herein.

Similarly, in an aspect, eNB 604 may include one or more processors 653 and/or a memory 655 that may be communicatively coupled, e.g., via one or more buses 657, and may operate in conjunction with or otherwise implement one or more of a scheduling component 662 for communicating with a UE 602 using traffic aggregation (e.g., via another access point 601 or otherwise over a different connection to the UE 602), and/or communicating using one or more dormant periods. For example, the various functions related to scheduling component 662 may be implemented or otherwise executed by one or more processors 653 and, in an aspect, can be executed by a single processor, while in other aspects, different ones of the functions may be executed by a combination of two or more different processors, as described above. In one example, the one or more processors 653 and/or memory 655 may be configured as described in examples above with respect to the one or more processors 603 and/or memory 605 of UE 602.

In an example, the one or more processors 653 and/or memory 655 may execute actions or operations defined by scheduling component 662 or its subcomponents. For instance, the one or more processors 653 and/or memory 655 may execute actions or operations defined by a mode configuring component 630 for configuring one or more communication modes having one or more dormant periods with the UE 602 (e.g., to communicate in one or more on or off durations of a DRX cycle, to schedule resources for communicating with the UE 602 using SPS, etc.). In an aspect, for example, mode configuring component 630 may include hardware (e.g., one or more processor modules of the one or more processors 653) and/or computer-readable code or instructions stored in memory 655 and executable by at least one of the one or more processors 653 to perform the specially configured mode configuring/communicating operations described herein.

Transceivers 606, 656, for example, may be configured to transmit and receive wireless signals through one or more antennas 615, 617, one or more RF front end components (e.g., power amplifier (PA), low noise amplifier (LNA), filter, digital-to-analog converter (DAC), analog-to-digital converter (ADC), etc.), one or more transmitters, and one or more receivers. In an aspect, transceivers 606, 656 may be tuned to operate at specified frequencies such that UE 602 and/or eNB 604 can communicate at a certain frequency. In an aspect, the one or more processors 603 may configure transceiver 606 and/or one or more processors 653 may configure transceiver 656 to operate at a specified frequency and power level based on a configuration, a communication protocol, etc. to communicate uplink signals 608 and/or downlink signals 609, respectively, over related uplink or downlink communication channels.

In an aspect, transceivers 606, 656 can operate in multiple bands (e.g., using a multiband-multimode modem, not shown) such to process digital data sent and received using transceivers 606, 656. In an aspect, transceivers 606, 656 can be multiband and be configured to support multiple frequency bands for a specific communications protocol. In an aspect, transceivers 606, 656 can be configured to support multiple operating networks and communications protocols. Thus, for example, transceivers 606, 656 may enable transmission and/or reception of signals based on a specified modem configuration. AP 601 may also have a processor, memory, transceiver, etc, which are not shown for ease of explanation.

FIG. 7 illustrates an example of a method 700 for communicating over multiple aggregated connections. Method 700 includes, at Block 702, establishing a first connection using a first RAT. In an aspect, communicating component 661, e.g., in conjunction with processor(s) 603, memory 605 and/or transceiver 606, can establish the first connection using the first RAT. For example, communicating component 661 can establish the first connection with a first access point, such as eNB 604. The first connection may correspond to a cellular RAT, such as LTE, where communicating component 661 can communicate with the first access point according to one or more communication modes having one or more dormant periods (e.g., a DRX mode having a DRX cycle, which may be configured by eNB 604, a SPS mode, where SPS resources may be configured by eNB 604, and/or the like).

Method 700 can also include, at Block 704, receiving a data packet over a second connection using a second RAT, where the data packet is from a data flow which is allowed or configured to be delivered via the first connection and the second connection. In an aspect, communicating component 661, e.g., in conjunction with processor(s) 603, memory 605 and/or transceiver 606, can receive the data packet over the second connection using the second RAT, where the data packet is from the data flow which is allowed or configured to be delivered via the first connection and the second connection. As described, for example, the data flow can be a common data flow over which each packet can be allowed or configured to be delivered by either the first connection or the second connection in traffic aggregation. For example, communicating component 661 can establish the second connection using the second RAT, which can include establishing the second connection with eNB 604, with access point 601, etc. As described above, eNB 604 may establish the second connection with UE 602 via access point 601, and may implement traffic aggregation in communicating packets to the UE 602. For example, eNB 604 may communicate data packets to the AP 601 for communicating to the UE 602 in PDCP aggregation, such that the eNB 604 and AP 601 provide the data flow. In this example, communicating component 661 can receive ordered packets in the data flow from the eNB 604 and/or AP 601 over respective connections. Communicating component 661 can additionally reorder the packets (e.g., based on a sequence number in the packets) for providing the ordered packets to an upper layer (e.g., a TCP layer) for processing.

Figure 9:
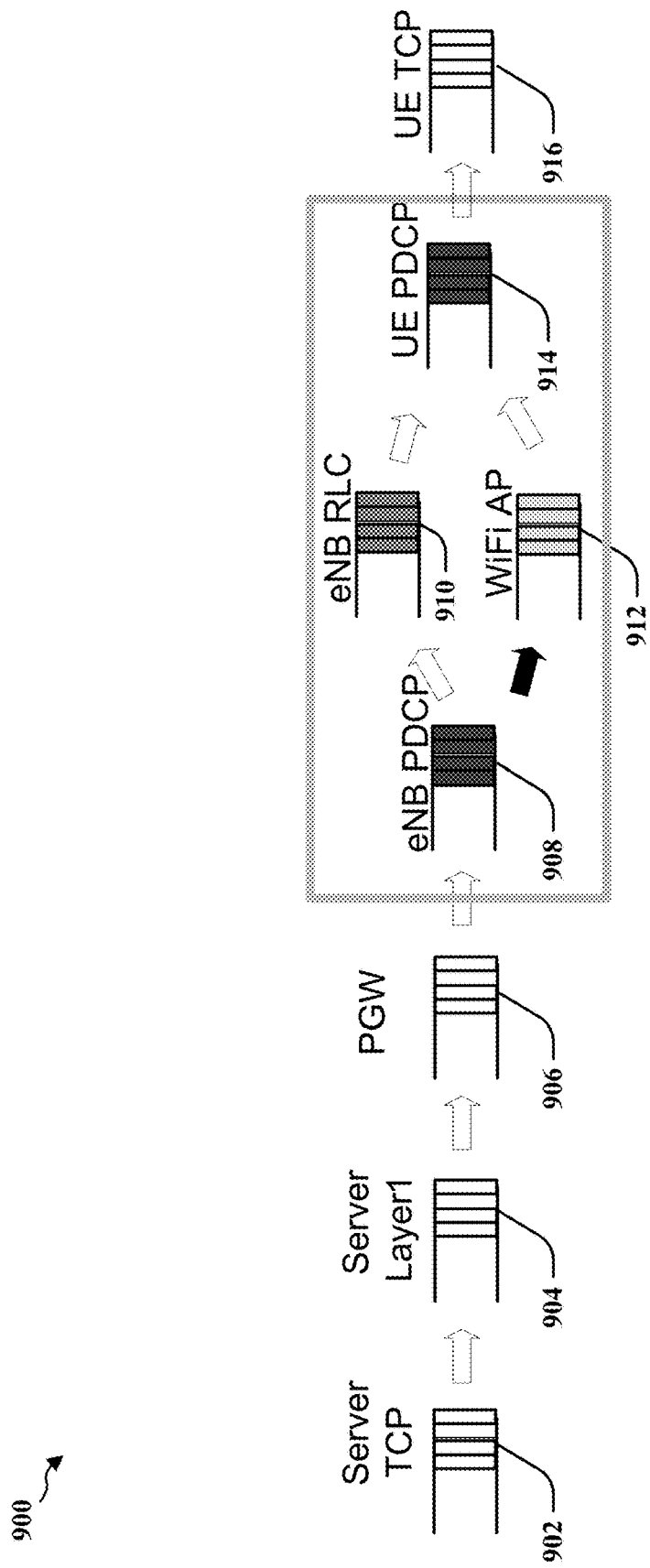
FIG. 9 illustrates examples of data flows over multiple aggregated connections in accordance with aspects described herein.

A specific example of a data flow 900 is shown in FIG. 9, where an eNB splits data packets at the PDCP layer for communicating over an eNB radio link control (RLC) layer and a WiFi AP in a data flow. FIG. 9 shows how the data flows over multiple intermediate nodes and protocols layers from a server to the UE. The server can generate and/or buffer packets at a TCP layer 902, which can be used to generate packets at another layer (e.g., layer 1 904), which can provide the packets to a PGW 906 for transmission via an eNB. PGW 906 can provide the packets to the eNB at a PDCP layer 908 (e.g., via one or more other network layers), and the PDCP layer 908 can manage transmission of the packets over multiple aggregated links, which may include an RLC layer 910 of the eNB and a WiFi AP 912, as described herein. Both the eNB RLC 910 and WiFi AP 912 can transmit the packets to a UE, which can combine packets received over both links into a common data flow at a PDCP layer 914 for providing to a TCP layer 916 at the UE for processing.

In an example, memory 605 of UE 602 may include a reorder buffer 618 for storing packets received out-of-sequence until a sequential packet is received. Where packets are received out-of-sequence (e.g., communicating component 661 receives a packet over a second connection before a next sequential packet is received over a first connection), communicating component 661 can store the received packet (and/or any other subsequent packets received out of sequence) in the reorder buffer 618. In an example, this may occur where a scheduler of the eNB 604 continues to transmit data to AP 601 for providing to the UE 602 though the first connection between the eNB 604 and UE 602 is in a dormant period. In another example, this may occur where the AP 601 has buffered data from the eNB 604 to transmit to the UE 602 when the first connection between the eNB 604 and UE 602 is in a dormant period. In any case, when communicating component 661 receives the next sequential packet over the first connection, communicating component 661 can reorder the packets for providing to an upper layer (e.g., TCP layer).

Figure 10:
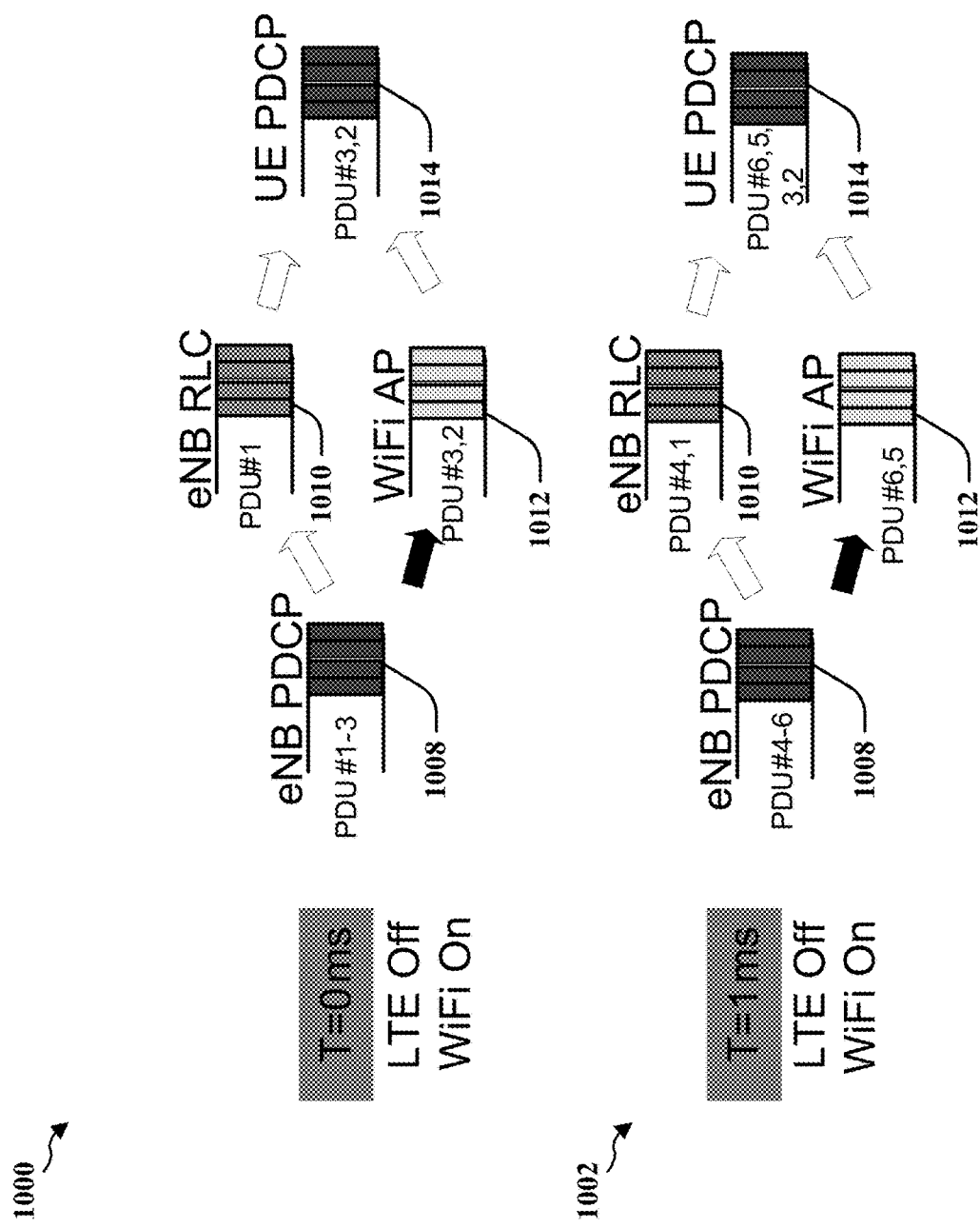
FIG. 10 illustrates examples of buffering packets over one or more data flows over multiple aggregated connections in accordance with aspects described herein.

Specific examples of data flows 1000, 1002 are shown in FIG. 10, where the eNB PDCP layer 1008 manages transmission of packets via the eNB RLC layer 1010 and the WiFi AP 1012 in traffic aggregation. In this example, however, the eNB RLC layer 1010 does not transmit some packets (e.g., protocol data unit (PDU) 1 and/or 4), and the UE PDCP layer 1014 can hold received packets (e.g., PDU 2, 3, 5, and/or 6) until the next sequential packet (e.g., PDU 1 and/or 4) is received from the eNB (e.g., via eNB RLC layer 1010).

In data flow 1000, the LTE communication link is off, which can indicate that the LTE communication link is in a dormant period, as described, and the WiFi communication link is on. For example, eNB RLC layer 1010 has buffered PDU 1, but has not transmitted PDU 1 since the LTE communication link is in the dormant period. When the UE receives PDU 2 from the WiFi AP 1012 before receiving PDU 1 from the eNB RLC layer 1010, the UE can start a reorder timer, as described, and/or can store PDU 2 and 3 in a reorder buffer. In data flow 1002, the LTE communication link is off, which can indicate that the LTE communication link is in a dormant period, as described, and the WiFi communication link is on. In this example, the eNB RLC layer 1010 has additionally received and buffered PDU 4, but has not transmitted PDU 1 or 4 to the UE since the LTE communication link is in the dormant period. For example, when the UE receives PDU 5 from the WiFi AP 1012 before receiving PDU 1 from the eNB RLC layer 1010, the UE can continue the reorder timer, as described, and/or can store PDU 5 in the reorder buffer. When PDUs 1 and 4 are eventually received from eNB RLC layer 1010, the UE PDCP layer 1014 can reorder PDUs 1, 2, 3, 4, and 5, and provide the reordered PDUs to an upper layer for processing.

Method 700 may also include, at Block 706, determining that the data packet is received over the second connection when the UE is operating in a dormant period with respect to the first connection. In an aspect, mode implementing component 610, e.g., in conjunction with processor(s) 603, memory 605 and/or transceiver 606, can determine that the data packet is received over the second connection when the UE is operating in the dormant period with respect to the first connection. For example, mode implementing component 610 can initiate a communications mode having one or more dormant periods, which can be based on a configuration received from eNB 604. For example, the communications mode can correspond to a DRX mode based on a DRX cycle, a SPS mode where the UE 602 can receive and utilize resources based on SPS, etc.

For example, mode implementing component 610 can initiate a DRX cycle based at least in part on a configuration received from the eNB 604, which can specify time periods related to initiating one or more DRX cycles, an on and/or off duration of the DRX cycle(s), etc. Thus, mode implementing component 610 can determine that the UE 602 is operating in the DRX cycle and/or whether the UE 602 is operating in an on or off duration with respect to the first connection based on the configuration and/or based on one or more aspects of the communications with the eNB 604. In another example, mode implementing component 610 can receive an indication of SPS resources for communication resources in one or more time periods. In this example mode implementing component 610 can determine one or more periods of time during which the UE 402 is not scheduled with SPS resources for receiving communications from the eNB 604. In either case, mode implementing component 610 can determine, based on the DRX configuration, scheduled SPS resources, etc., whether and/or when the UE 402 is operating in a dormant period over the first connection.

Moreover, for example, communicating component 661 can receive the data packet over the second connection (e.g., from AP 601 in traffic aggregation with multiple access points and/or from eNB 604 over one of multiple connections). As described, receiving the data packet over the second connection when the UE 602 is in a dormant period with respect to the first connection (e.g., in an off duration of the DRX cycle, or a period with no scheduled SPS resources) can lead to out of order packets received at the UE 602, and the UE 602 waiting for a next sequential packet from the first connection while continuing to receive and store data packets from the second connection in the reorder buffer 618. Accordingly, mode terminating component 612 can request termination of the communication mode and/or at least termination of the one or more dormant periods in this case, as described further herein.

In one example, method 700 may optionally include, at Block 708, storing the data packet in a reorder buffer for reordering the data packets in the data flow. In an aspect, communicating component 661, e.g., in conjunction with processor(s) 603, memory 605 and/or transceiver 606, can store the data packet in the reorder buffer 618 for reordering data packets in the data flow. In an example, mode terminating component 612 can detect storing of the data packet in the reorder buffer 618, and mode terminating component 612 may request termination of the communication mode or at least the one or more dormant periods based at least in part on detecting storing of the data packet (e.g., in addition to detecting that a size of the reorder buffer achieves a threshold, as described below).

In another example, method 700 may optionally include, at Block 710, detecting that a size of the reorder buffer achieves a threshold. In an aspect, mode terminating component 612, e.g., in conjunction with processor(s) 603, memory 605 and/or transceiver 606, can detect that the size of the reorder buffer 618 achieves a threshold (e.g., based on storing the data packet from the second connection). As described further here, mode terminating component 612 may request termination of the communication mode or at least the one or more dormant periods based on detecting the size of the reorder buffer 618 achieving a threshold. In one example, the threshold can be configured at the UE 602 based on a stored configuration, a configuration received from eNB 604 or another network node, etc.

Method 700 also includes, at Block 712, requesting a termination of the dormant period over the first connection based at least in part on determining that the data packet is received over the second connection when the UE is operating in the dormant period with respect to the first connection. In an aspect, mode terminating component 612, e.g., in conjunction with processor(s) 603, memory 605 and/or transceiver 606, can request the termination of the dormant period over the first connection based at least in part on determining that the data packet is received over the second connection (which may include determining the data packet is stored in the reorder buffer 618, that storage of the data packet in the reorder buffer 618 causes the reorder buffer 618 to achieve a threshold capacity or size, etc., as described) when the UE is operating in the dormant period with respect to the first connection. Moreover, for example, mode terminating component 612 may request termination of the dormant period as a part of requesting termination of a communication mode having the dormant period, requesting termination of multiple upcoming dormant periods, etc.

For example, the UE 602 may request termination of the DRX cycle and/or termination of an off duration of the DRX cycle, initiation of an on duration or DRX Active Time of a new DRX cycle (or a configured number of DRX cycles), etc. For example, requesting termination of the dormant period at Block 712 may optionally include, at Block 714, transmitting a request to a first access node to terminate the DRX cycle. In an aspect, mode terminating component 612, e.g., in conjunction with processor(s) 603, memory 605 and/or transceiver 606, can transmit the request to the first access node (e.g., eNB 604) to terminate the DRX cycle. This can be an explicit message to terminate the DRX cycle (or at least an off duration of the DRX cycle), to start a new DRX cycle, to switch to an on duration or DRX Active Time of the DRX cycle, to disable DRX temporarily for a configured number of DRX cycles (e.g., without switching to an off duration in the number of DRX cycles), etc. In another example, requesting termination of the dormant period at Block 712 may include, at Block 716, transmitting a scheduling request to a first access node. In an aspect, mode terminating component 612, e.g., in conjunction with processor(s) 603, memory 605 and/or transceiver 606, can transmit the scheduling request to the first access node (e.g., eNB 604) which effectively cancels the DRX cycle (or at least the off duration thereof), etc. For example, this can result in UE 602 entering DRX Active Time to communicate with the first access node (e.g., to transmit communications thereto and/or to allow the first access node to transmit communications to the UE 602).

Method 700 may also optionally include, at Block 718, terminating the DRX cycle based on requesting termination of the DRX cycle. In an aspect, mode terminating component 612, e.g., in conjunction with processor(s) 603, memory 605 and/or transceiver 606, can additionally terminate the DRX cycle, or a configuration for the DRX cycle, at UE 602 based on requesting termination of the DRX cycle. For example, mode terminating component 612 can reset the DRX cycle, activate communication resources to receive communications from the eNB 604, determine newly scheduled resources received from the eNB 604 for receiving communications therefrom, maintain a DRX Active Time for a configured number of DRX cycles, etc. In addition, for example, terminating the DRX cycle can include communicating component 661 monitoring one or more channels for the eNB 604 (e.g., paging channel, control channel, data channel, etc.) during what would otherwise be the off duration of the DRX cycle.

In one specific example, the eNB 604 can communicate with UE 602 over the first connection using LTE and may implement traffic aggregation using AP 601 to communicate with UE using WiFi. In this example, eNB 604 may configure UE 602 to operate in C-DRX over the LTE connection, and mode implementing component 610 can communicate with the UE 602 using C-DRX according to one or more on and/or off durations of a C-DRX cycle. Communicating component 661 can receive a data flow of data packets over the LTE connection with eNB 604 and over the WiFi connection with AP 601. Mode implementing component 610 can enter a C-DRX cycle over the LTE connection, and then can detect receipt of an out of order packet in the data flow over the WiFi connection from AP 601. Communicating component 661 can buffer the out of order packet in reorder buffer 618, and can continue to receive and buffer out of order packets, waiting on a next sequential packet in the data flow from eNB 604. Upon detecting this condition (e.g., based on mode implementing component 610 detecting the C-DRX cycle along with at least one of: receipt of the out of order data packets over WiFi; storage of the data packets in the reorder buffer 618; determining the reorder buffer achieving a threshold capacity, etc.), mode terminating component 612 can request, detect, or perform termination of the C-DRX cycle. eNB 604 can accordingly cancel the C-DRX cycle (and/or an off duration of the C-DRX cycle) and can resume transmitting data packets to the UE 602, which may result in the eNB 604 transmitting, and the UE 602 receiving, the next sequential packet in the data flow. In addition, the transmitting may occur in resetting the C-DRX cycle, switching to an on duration or C-DRX Active Time in the C-DRX cycle, transmitting over newly configured resources, etc.

In another specific example, the eNB 604 can communicate with UE 602 over the first connection using LTE and may implement traffic aggregation using AP 601 to communicate with UE using WiFi. In this example, eNB 604 may configure UE 602 with SPS resources over the LTE connection, and mode implementing component 610 can communicate with the UE 602 using SPS configured resources, which are semi-persistent in design such that the UE 602 may experience periods of time during which it is not scheduled with resources for receiving communications from the eNB 604. Communicating component 661 can receive a data flow of data packets over the LTE connection with eNB 604 and over the WiFi connection with AP 601. Mode implementing component 610 can detect receipt of an out of order packet in the data flow over the WiFi connection from AP 601. Communicating component 661 can buffer the out of order packet in reorder buffer 618, and can continue to receive and buffer out of order packets, waiting on a next sequential packet in the data flow from eNB 604. Upon detecting this condition (e.g., based on mode implementing component 610 detecting the SPS configuration along with at least one of: receipt of the out of order data packets over WiFi; storage of the data packets in the reorder buffer 618; determining the reorder buffer achieving a threshold capacity, etc.), mode terminating component 612 can request, detect, or perform termination of the SPS configuration, which may include requesting an assignment of communication resources from the eNB 604, transmitting a request to terminate SPS scheduling of resources in favor of more persistent scheduling of resources (at least for a period of time), etc. eNB 604 can accordingly schedule resources to the UE 602 to receive communications and can resume transmitting data packets to the UE 602, which may result in the eNB 604 transmitting, and the UE 602 receiving, the next sequential packet in the data flow.

FIG. 8 illustrates an example of a method 800 for communicating over multiple aggregated connections. Method 800 includes, at Block 802, communicating with a UE using a first RAT over a first connection. In an aspect, scheduling component 662, e.g., in conjunction with processor(s) 653, memory 655 and/or transceiver 656, can communicate with the UE (e.g., UE 602) using a first RAT over a first connection. For example, scheduling component 662 can provide resources to the UE 602 for receiving communications from (and/or transmitting communications to) eNB 604. Mode configuring component 630 can additionally configure the first connection to utilize one or more communication modes having one or more dormant periods in receiving communications from the eNB 604 such that the UE 602 can sleep at least a portion of communication resources (e.g., a transceiver 606 or related components). For example, the one or more communications mode can include a DRX mode based on a DRX cycle where the UE 602 can sleep, terminate, or reduce power to communication resources during an off duration of the DRX cycle. In another example, the one or more communications mode can include a SPS mode where the UE 602 can sleep, terminate, or reduce power to communication resources during certain periods of time where communication resources are not scheduled by the eNB 604 (e.g., between resources scheduled using SPS).

Method 800 can also include, at Block 804, aggregating communications with the UE using a second RAT over a second connection. In an aspect, scheduling component 662, e.g., in conjunction with processor(s) 653, memory 655 and/or transceiver 656, can aggregate the communications with the UE 602 using the second RAT over the second connection. For example, scheduling component 662 can establish the second connection for UE 602 via AP 601 or can otherwise provide the UE 602 with multiple connections. eNB 604 and/or UE 602 can configure the multiple connections in traffic aggregation such that the eNB 604 can leverage the connections to provide a common data flow over a higher network layer (e.g., a RLC layer, PDCP layer, etc.) using the multiple connections at lower layers (e.g., a physical layer, MAC layer, RLC layer, etc.) for improved throughput, examples of which are shown in FIG. 9, as explained above. As described, the UE 602 can receive data packets from the eNB 604 and/or AP 601 over the multiple connections, and can reorder the data packets for providing to a higher layer (e.g., TCP).

Method 800 can also include, at Block 806, receiving a request from the UE to terminate a dormant period over the first connection. In an aspect, mode configuring component 630, e.g., in conjunction with processor(s) 653, memory 655 and/or transceiver 656, can receive the request from the UE (e.g., UE 602) to terminate the dormant period (e.g., as part of a request to terminate an associated communication mode, a request to terminate multiple dormant periods, etc.) over the first connection. In this regard, for example, mode configuring component 630 can receive the request from the UE as a message to at least one of cancel or reset a DRX cycle, switch the current off duration to an on duration, etc. Moreover, in an example, receiving the request at Block 806 may optionally include, at Block 808, receiving a scheduling request from the UE. In an aspect, scheduling component 662, e.g., in conjunction with processor(s) 653, memory 655 and/or transceiver 656, can receive the scheduling request from the UE 602. This can be a scheduling request for a resource grant from the eNB 604 for downlink or uplink resources for receiving communications therefrom.

Method 800 also includes, at Block 810, terminating the dormant period for the UE over the first connection. In an aspect, mode configuring component 630, e.g., in conjunction with processor(s) 653, memory 655 and/or transceiver 656, can terminate the dormant period for the UE (e.g., UE 602) over the first connection (e.g., based on receiving the request). For example, mode configuring component 630 can terminate or reset a configured DRX cycle or SPS configuration, switch an off duration to an on duration or DRX Active Time of the configured DRX cycle, assign resources to the UE 602 outside of the DRX cycle or SPS configuration, etc., to effectively cancel the dormant period (and/or one or more upcoming dormant periods), etc. In addition, mode configuring component 630 may terminate the DRX cycle or SPS configuration, switch the off duration of the DRX cycle to an on duration or DRX Active Time, and/or assign resources to the UE 602 for a configured number of DRX cycles or periods of time (e.g., a configured number of symbols).

Terminating the DRX cycle at Block 810 may optionally include, at Block 812, transmitting an indication to enter an on duration (or DRX Active Time) for a configured number of DRX cycles to the UE (e.g., without switching to an off duration for the number of DRX cycles). In an aspect, mode configuring component 630, e.g., in conjunction with processor(s) 653, memory 655 and/or transceiver 656, can transmit the indication to enter the on duration for the configured number of DRX cycles to the UE 602. In an example, the UE 602 can have specified the configured number of DRX cycles in the request. In another example, mode configuring component 630 can specify the number of DRX cycles to the UE 602.

In another example, terminating the DRX cycle, at Block 810, may optionally include, at Block 814, transmitting a resource grant to the UE. In an aspect, scheduling component 662, e.g., in conjunction with processor(s) 653, memory 655 and/or transceiver 656, can transmit the resource grant to the UE 602 (e.g., based on a scheduling request, as described). In any case, eNB 604 can continue transmitting data packets to the UE 602 during a newly configured DRX cycle, during the DRX on duration or DRX Active Time, and/or over newly configured resources such to deliver a next sequential data packet to the UE 602.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for communicating using traffic aggregation, comprising:

establishing, by a user equipment (UE), a first connection using a first radio access technology (RAT), wherein the UE operates in a communication mode having one or more dormant periods with respect to the first connection;

receiving, by the UE, a data packet over a second connection using a second RAT, wherein the data packet is from a data flow which is allowed or configured to be delivered via the first connection and the second connection;

determining that the data packet is received over the second connection when the UE is operating in a dormant period of the one or more dormant periods with respect to the first connection; and requesting a termination of the dormant period over the first connection based at least in part on determining that the data packet is received over the second connection when the UE is operating in the dormant period with respect to the first connection, wherein requesting the termination of the dormant period comprises transmitting a request to a first access node over the first connection to terminate the dormant period.

2. The method of claim 1, wherein determining that the data packet is received when the UE is operating in the dormant period comprises determining that the data packet is received when the UE is operating in an off duration of a discontinuous reception (DRX) cycle, and wherein requesting the termination of the dormant period is based at least in part on determining that the data packet is received when the UE is operating in the off duration of the DRX cycle.

3. The method of claim 1, wherein determining that the data packet is received when the UE is operating in the dormant period comprises determining that the data packet is received during a period where the UE is not scheduled resources in semi-persistent scheduling (SPS), and wherein requesting the termination of the dormant period is based at least in part on determining that the data packet is received when the UE is not scheduled resources in SPS.

4. The method of claim 1, further comprising storing the data packet in a reorder buffer for reordering data packets in the data flow, wherein requesting termination of the dormant period is further based at least in part on storing the data packet in the reorder buffer.

5. The method of claim 4, further comprising detecting that a size of the reorder buffer achieves a threshold, wherein requesting the termination of the dormant period is further based at least in part on detecting the size of the reorder buffer achieving the threshold.

6. The method of claim 1, wherein the request comprises a scheduling request transmitted to the first access node to request resources for receiving additional data packets from the first access node.

7. The method of claim 1, further comprising terminating a discontinuous reception (DRX) cycle based at least in part on requesting termination of the dormant period.

8. The method of claim 7, wherein terminating the DRX cycle comprises entering an on duration for a configured number of DRX cycles.

9. The method of claim 1, wherein the first RAT is third generation partnership (3GPP) long term evolution (LTE), and the second RAT is Institute of Electrical and Electronics Engineers (IEEE) 802.11 WiFi.

10. An apparatus for communicating using traffic aggregation, comprising:
a transceiver;
at least one processor communicatively coupled with the transceiver via a bus for communicating signals in a wireless network; and
a memory communicatively coupled with the at least one processor and/or the transceiver via the bus;
wherein the at least one processor is configured to:
establish, via the transceiver, a first connection using a first radio access technology (RAT), wherein the apparatus operates in a communication mode having one or more dormant periods with respect to the first connection;
receive, via the transceiver, a data packet over a second connection using a second RAT, wherein the data packet is from a data flow which is allowed or configured to be delivered via the first connection and the second connection;
determine that the data packet is received over the second connection when the apparatus is operating in a dormant period of the one or more dormant periods with respect to the first connection; and
request a termination of the dormant period over the first connection based at least in part on determining that the data packet is received over the second connection when the apparatus is operating in the dormant period with respect to the first connection,
wherein the at least one processor is configured to request the termination of the dormant period at least in part by transmitting a request to a first access node over the first connection to terminate the dormant period.

11. The apparatus of claim 10, wherein the at least one processor is configured to determine that the data packet is received when the apparatus is operating in the dormant period at least in part by determining that the data packet is received when the apparatus is operating in an off duration of a discontinuous reception (DRX) cycle, and wherein the at least one processor is configured to request the termination of the dormant period based at least in part on determining that the data packet is received when the apparatus is operating in the off duration of the DRX cycle.

12. The apparatus of claim 10, wherein the at least one processor is configured to determine that the data packet is received when the apparatus is operating in the dormant period at least in part by determining that the data packet is received during a period where the apparatus is not scheduled resources in semi-persistent scheduling (SPS), and wherein the at least one processor is configured to request the termination of the dormant period based at least in part on determining that the data packet is received when the apparatus is not scheduled resources in SPS.

13. The apparatus of claim 10, wherein the at least one processor is further configured to store the data packet in a reorder buffer for reordering data packets in the data flow, wherein the at least one processor is configured to request termination of the dormant period further based at least in part on storing the data packet in the reorder buffer.

14. The apparatus of claim 13, wherein the at least one processor is further configured to detect that a size of the reorder buffer achieves a threshold, wherein the at least one processor is configured to request the termination of the dormant period further based at least in part on detecting the size of the reorder buffer achieving the threshold.

15. The apparatus of claim 10, wherein the request comprises a scheduling request transmitted to the first access node to request resources for receiving additional data packets from the first access node.

16. The apparatus of claim 10, wherein the at least one processor is further configured to terminate a discontinuous reception (DRX) cycle based at least in part on requesting termination of the dormant period.

17. The apparatus of claim 16, wherein the at least one processor is configured to terminate the DRX cycle at least in part by entering an on duration for a configured number of DRX cycles.

18. The apparatus of claim 10, wherein the first RAT is third generation partnership (3GPP) long term evolution (LTE), and the second RAT is Institute of Electrical and Electronics Engineers (IEEE) 802.11 WiFi.

19. An apparatus for communicating using traffic aggregation, comprising:
means for establishing a first connection using a first radio access technology (RAT), wherein the apparatus operates in a communication mode having one or more dormant periods with respect to the first connection;
means for receiving a data packet over a second connection using a second RAT, wherein the data packet is from a data flow which is allowed or configured to be delivered via the first connection and the second connection;
means for determining that the data packet is received over the second connection when the apparatus is operating in a dormant period of the one or more dormant periods with respect to the first connection; and means for requesting a termination of the dormant period over the first connection based at least in part on the means for determining determining that the data packet is received over the second connection when the apparatus is operating in the dormant period with respect to the first connection, wherein the means for requesting requests the termination of the dormant period at least in part by transmitting a request to a first access node over the first connection to terminate the dormant period.

20. The apparatus of claim 19, wherein the means for determining determines that the data packet is received when the apparatus is operating in the dormant period at least in part by determining that the data packet is received when the apparatus is operating in an off duration of a discontinuous reception (DRX) cycle, and wherein the means for requesting requests the termination of the dormant period based at least in part on determining that the data packet is received when the apparatus is operating in the off duration of the DRX cycle.

21. The apparatus of claim 19, wherein the means for determining determines that the data packet is received when the apparatus is operating in the dormant period at least in part by determining that the data packet is received during a period where the apparatus is not scheduled resources in semi-persistent scheduling (SPS), and wherein the means for requesting requests the termination of the dormant period based at least in part on determining that the data packet is received when the apparatus is not scheduled resources in SPS.

22. The apparatus of claim 19, further comprising means for storing the data packet in a reorder buffer for reordering data packets in the data flow, wherein the means for requesting requests termination of the dormant period further based at least in part on storing the data packet in the reorder buffer.

23. A non-transitory computer-readable storage medium comprising computer-executable code for communicating using traffic aggregation, the code comprising:

code for establishing, by a user equipment (UE), a first connection using a first radio access technology (RAT), wherein the UE operates in a communication mode having one or more dormant periods with respect to the first connection;

code for receiving, by the UE, a data packet over a second connection using a second RAT, wherein the data packet is from a data flow which is allowed or configured to be delivered via the first connection and the second connection;

code for determining that the data packet is received over the second connection when the UE is operating in a dormant period of the one or more dormant periods with respect to the first connection; and code for requesting a termination of the dormant period over the first connection based at least in part on the code for determining determining that the data packet is received over the second connection when the UE is operating in the dormant period with respect to the first connection, wherein the code for requesting requests the termination of the dormant period at least in part by transmitting a request to a first access node over the first connection to terminate the dormant period.

24. The non-transitory computer-readable storage medium of claim 23, wherein the code for determining determines that the data packet is received when the UE is operating in the dormant period at least in part by determining that the data packet is received when the UE is operating in an off duration of a discontinuous reception (DRX) cycle, and wherein the code for requesting requests the termination of the dormant period based at least in part on determining that the data packet is received when the UE is operating in the off duration of the DRX cycle.

25. The non-transitory computer-readable storage medium of claim 23, wherein the code for determining determines that the data packet is received when the UE is operating in the dormant period at least in part by determining that the data packet is received during a period where the UE is not scheduled resources in semi-persistent scheduling (SPS), and wherein the code for requesting requests the termination of the dormant period based at least in part on determining that the data packet is received when the UE is not scheduled resources in SPS.

26. The non-transitory computer-readable storage medium of claim 23, further comprising code for storing the data packet in a reorder buffer for reordering data packets in the data flow, wherein the code for requesting requests termination of the dormant period further based at least in part on storing the data packet in the reorder buffer.

* * * * *